United States Patent
Rao et al.

(10) Patent No.: US 7,415,574 B2
(45) Date of Patent: Aug. 19, 2008

(54) DYNAMIC, ON-DEMAND STORAGE AREA NETWORK (SAN) CACHE

(75) Inventors: Raghavendra J. Rao, Bangalore (IN); Murali Basavaiah, Sunnyvale, CA (US); Urshit Parikh, Sunnyvale, CA (US); Varagur Chandrasekaran, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 111 days.

(21) Appl. No.: 11/481,487

(22) Filed: Jul. 5, 2006

(65) Prior Publication Data

US 2008/0010409 A1  Jan. 10, 2008

(51) Int. Cl.
*G06F 12/00* (2006.01)
(52) U.S. Cl. ........................ 711/118; 711/113
(58) Field of Classification Search ........................ None
See application file for complete search history.

(56) References Cited

U.S. PATENT DOCUMENTS

| | | | |
|---|---|---|---|
| 6,182,197 B1 | 1/2001 | Dias et al. | |
| 6,681,310 B1 | 1/2004 | Kusters et al. | |
| 7,003,780 B2 | 2/2006 | Peloquin et al. | |
| 7,072,894 B2 | 7/2006 | Loy et al. | |
| 7,191,285 B2* | 3/2007 | Scales et al. | 711/114 |
| 7,260,628 B2* | 8/2007 | Yamamoto et al. | 709/224 |
| 7,277,984 B2* | 10/2007 | Ghosal et al. | 711/112 |
| 2004/0049572 A1* | 3/2004 | Yamamoto et al. | 709/224 |
| 2005/0086427 A1* | 4/2005 | Fozard et al. | 711/111 |
| 2005/0210084 A1* | 9/2005 | Goldick et al. | 707/205 |
| 2005/0289312 A1* | 12/2005 | Ghosal et al. | 711/167 |
| 2006/0072580 A1* | 4/2006 | Dropps et al. | 370/395.7 |
| 2006/0072616 A1* | 4/2006 | Dropps et al. | 370/474 |
| 2007/0011276 A1 | 1/2007 | Sharma et al. | |
| 2007/0011424 A1 | 1/2007 | Sharma et al. | |
| 2007/0113008 A1* | 5/2007 | Scales et al. | 711/114 |
| 2007/0271377 A1* | 11/2007 | Yamamoto et al. | 709/224 |
| 2008/0016310 A1* | 1/2008 | Ghosal et al. | 711/167 |

OTHER PUBLICATIONS

EMC2 and Fujitsu Siemens Computers, Global Recovery Demonstration: SRDF/A and Primecluster-EMC Remote Data Facility/Asynchronous Fujitsu Siemens Computers Primecluster, Feb. 2004, pp. 1-26.
EMC2, EMC SRDF Family, Powerful remote replication solutions improve organizational productivity, enhance online business continuity, 2004, pp. 1-11.

* cited by examiner

*Primary Examiner*—Kevin Verbrugge
(74) *Attorney, Agent, or Firm*—Weaver Austin Villeneuve & Sampson LLP

(57) ABSTRACT

Disclosed are apparatus and methods for facilitating caching in a storage area network (SAN). In general, data transfer traffic between one or more hosts and one or more memory portions in one or more storage device(s) is redirected to one or more cache modules. One or more network devices (e.g., switches) of the SAN can be configured to redirect data transfer for a particular memory portion of one or more storage device(s) to a particular cache module. As needed, data transfer traffic for any number of memory portions and storage devices can be identified for or removed from being redirected to a particular cache module. Also, any number of cache modules can be utilized for receiving redirected traffic so that such redirected traffic is divided among such cache modules in any suitable proportion for enhanced flexibility.

34 Claims, 22 Drawing Sheets

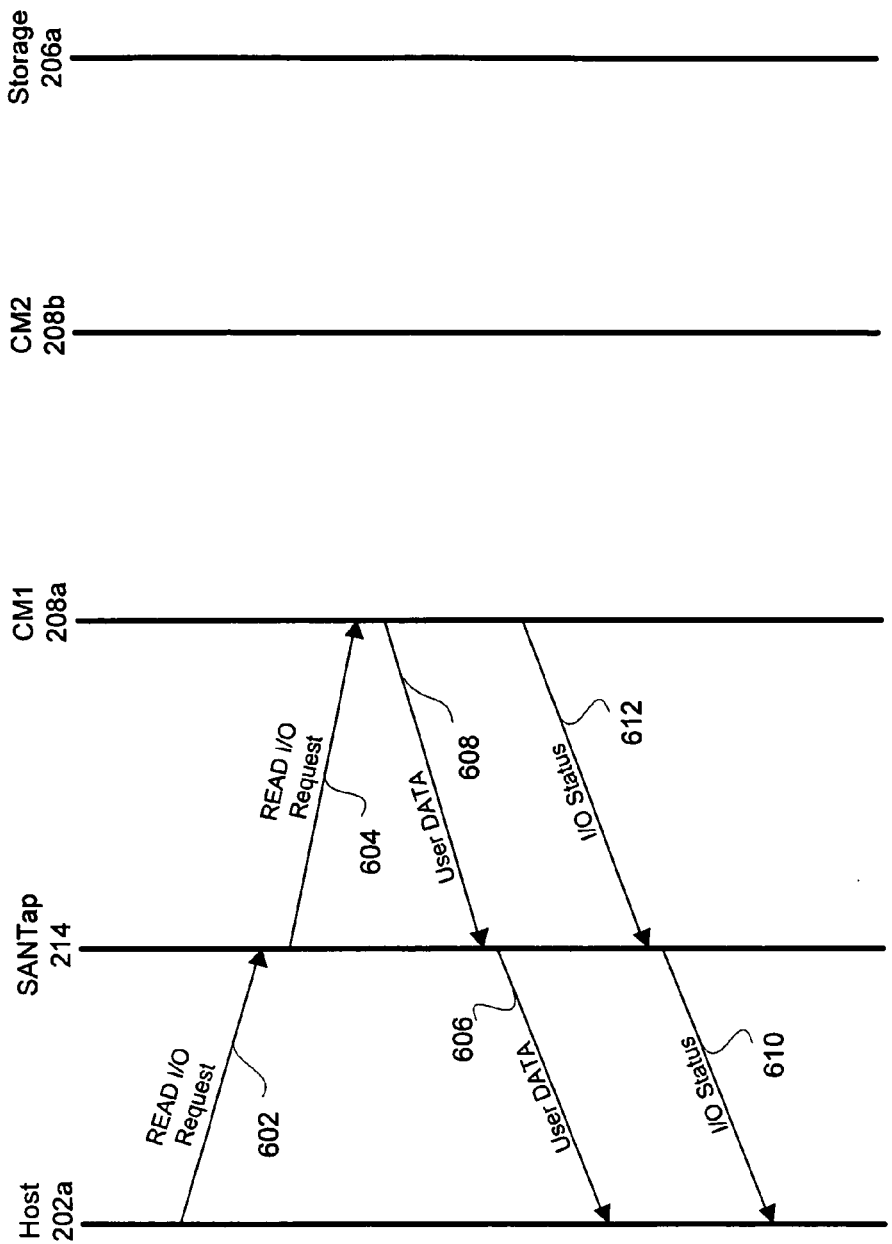

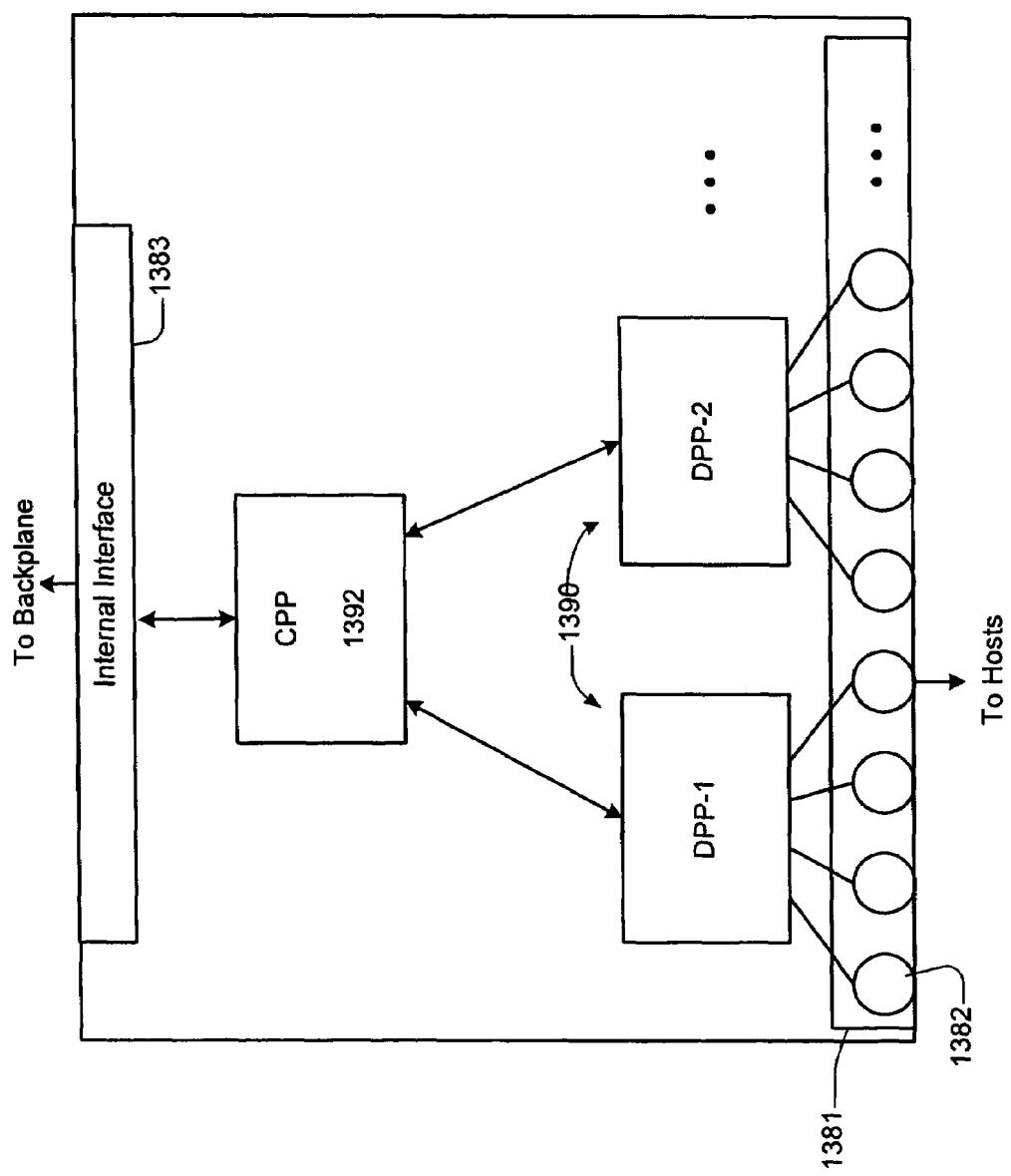

DYNAMIC, ON-DEMAND STORAGE AREA NETWORK (SAN) CACHE

BACKGROUND OF THE INVENTION

The present invention relates to storage area networks. More particularly, the present invention relates to methods and apparatus for providing cache storage in a storage area network (SAN).

A particular SAN has different cost and performance aspects based on the type of storage systems deployed. The high end storage systems like EMC Symmetrix, DMX, Hitachi 9960s, IBM Shark, etc. have customized hardware designed for scalability of memory size (e.g., can provide hundreds of GB) and performance. However, these systems are extremely expensive.

In contrast, mid-range storage systems have limited amount of cache memory (e.g., a few GBs) and can not offer the performance levels of high end systems. There is also a utilization related problem in a SAN formed from a high number of mid-range storage systems. Unfortunately, the caches in both of the mid-range and high end systems are not sharable beyond the systems in which they reside. Assuming that at any given point in time, the hosts only access a particular amount of the storage (compared to the entire available capacity), it can be assumed that not all mid-range systems are going through storage access operations all the time. Accordingly, if the sum of caches of all those idling systems is a significant number, a significant amount of cache memory is unutilized.

In light of the foregoing, it would be beneficial to bridge the price and utilization gaps in current SAN cache memory systems.

SUMMARY OF THE INVENTION

The present invention provides apparatus and methods for facilitating caching in a storage area network (SAN). In general, a memory portion of a storage device (e.g., target and LUN or T,L) is identified for caching in a specified cache module. In response to data transfer traffic that is sent to the identified memory portion, data that resides in such identified memory portion is then caused to be cached in the identified cache module or another cache module that is associated with such identified cache module. One or more network devices (e.g., switches) of the SAN are configured to at least initiate the caching. As needed, data transfer traffic for any number of memory portions and storage devices can be identified for (or removed from) caching to a particular cache module. Also, any number of cache modules can be utilized for data caching so that data from any number of memory portions and/or storage devices can be divided among such cache modules in any suitable proportion for enhanced flexibility.

These and other features and advantages of the present invention will be presented in more detail in the following specification of the invention and the accompanying figures which illustrate by way of example the principles of the invention.

BRIEF DESCRIPTION OF THE DRAWINGS

FIG. 6A is a communication diagram illustrating a procedure for handling a READ I/O request for a cache hit in accordance with one embodiment of the present invention.

FIG. 13 is a block diagram illustrating a portion of an exemplary switch or intelligent line card in which various embodiments of the present invention may be implemented.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1A:
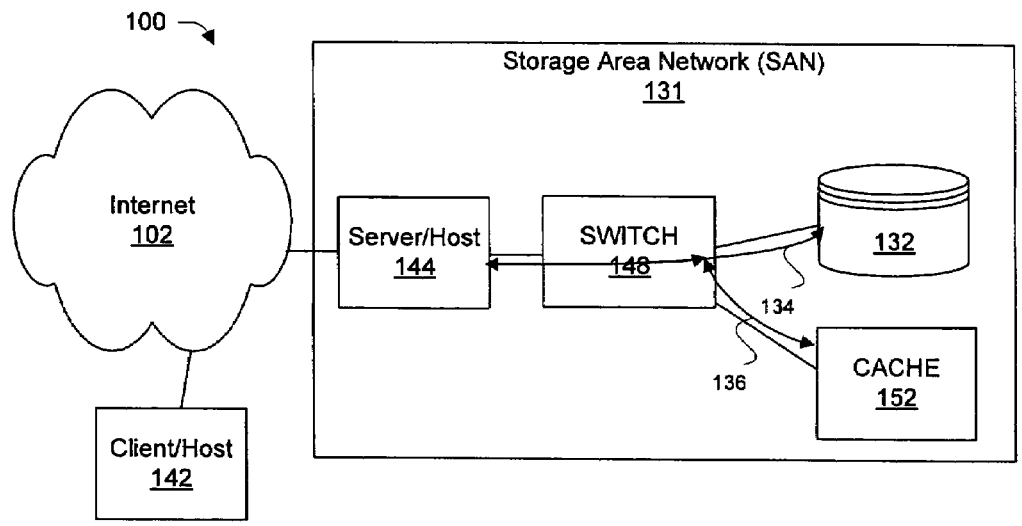
FIG. 1A is a block diagram illustrating an exemplary storage area network in which various embodiments of the invention may be implemented.

FIG. 1A is block diagram illustrating a simplified network 100 in which various embodiments of the invention may be implemented. Any portion of network 100 may take the form of a storage area network (SAN) 131, such as a bank's financial data center, for handling requests for data as initiated by any suitable type of entity, such as a customer's host or client computer 142. Of course, a plurality of hosts/clients (not shown) typically would be able to access such a SAN 131. In current networks, the client 142 typically sends requests to SAN 131 via a wide area network, such as the Internet 102. The SAN 131 may also implement virtualization, and such a network may be referred to as a virtual storage area network (VSAN). Virtualization generally refers to the use of software entities to represent one or more physical entities. For example, a virtual port (e.g., of a switch) may represent two physical ports (e.g., of the switch). However, so as to simplify this initial description, only a SAN without virtualization will be described although embodiments of the present invention may include at least some virtualized entities in the SAN.

In a SAN, data may be read from, as well as written to, various portions of a storage devices 132 within SAN 131 in response to commands sent by client 142 to one or more servers or hosts, e.g., 144, of SAN 131. Communication among a storage device and host is accomplished by coupling the storage device and host together via one or more switches, routers, or other network nodes configured to perform switching functions, such as switch 148. Typically, the SAN would include a plurality of interconnected hosts, switches, and storage devices. These switches may also communicate with one another via an interswitch link.

Although the network device described above with reference to FIG. 1 is described as a switch, the present invention may be practiced with respect to any suitable type of network device. Thus, other network devices such as routers may be implemented to receive, process, modify and/or generate packets or frames with functionality such as that described herein for transmission in a storage area network. Moreover, the network devices described herein are merely illustrative, and therefore other configurations of a network device may be utilized to implement the disclosed inventive embodiments.

In some of the discussion herein, the functions of switches of this invention are described in terms of the SCSI (Small Computer System Interface) protocol. This is because many storage area networks in commerce run a SCSI protocol to access storage sites. However, the present invention may be implemented using any suitable device connectivity protocol, besides SCSI. Currently, storage area networks also employ the Fibre Channel (FC) protocol (FC-PH (ANSI X3.230-1994, Fibre Channel—Physical and Signaling Interface) as a lower level protocol and runs IP (Internet Protocol) and SCSI on top of Fibre Channel. Note that the invention is not limited to any of these protocols and may be applied to any protocol, such as FC, iSCSI, FCIP, iFCP, Ethernet, FV, etc. The implemented protocols may also include any permutation of SCSI, such as SCSI over FC, iSCSI (SCSI over IP), parallel SCSI (SCSI over a parallel cable), serial SCSI (SCSI over serial cable, and all the other incarnations of SCSI.

Because SCSI is so widely used in storage area networks, much of the terminology used herein will be SCSI terminology. The use of SCSI terminology (e.g., "initiator" and "target") does not imply that the described procedure or apparatus must employ SCSI. Before going further, it is worth explaining a few of the SCSI terms that will be used in this discussion. First an "initiator" is a device (usually a host system) that requests an operation to be performed by another device. Typically, in the context of this document, a host initiator will request a read or write operation be performed on a region of virtual or physical memory. Next, a "target" is a virtual or physical device that performs an operation requested by an initiator. For example, a target physical or virtual memory disk will obtain or write data as initially requested by a host initiator. Note that while the host initiator may provide instructions to READ from or WRITE to a "virtual" target having a virtual address, a fabric switch (or some other mechanism) first converts those instructions to a physical target address before instructing the target.

In general, embodiments of the present invention provide flexible caching services for hosts accessing storage devices. In a simple example, switch 148 is configured to cache data for a specific memory portion (e.g., LUN) of a specific storage device 132 to a cache device 152. A cache device differs significantly from a storage device in several ways. For example, a cache device is characterized by no access latency for a cache hit case, while a storage device is characterized by media constrained rotational delays and seek time (assuming that no cache exists in the storage device).

In most cases, the WRITE data traffic will be sent to both the original destination as well as the cache. Mechanisms may also be provided for the switch 148 or cache 152 to retrieve data from storage device 132 through switch 148, e.g., during a miss, and then store such retrieved data in cache 152 for later retrieval. In more complex embodiments, a plurality of switches may be configured to initiate caching. In certain case, a plurality of switches may also be configured to provide cache management (e.g., serve as a cache engine), such as handling data misses for the cache.

Figure 1B:
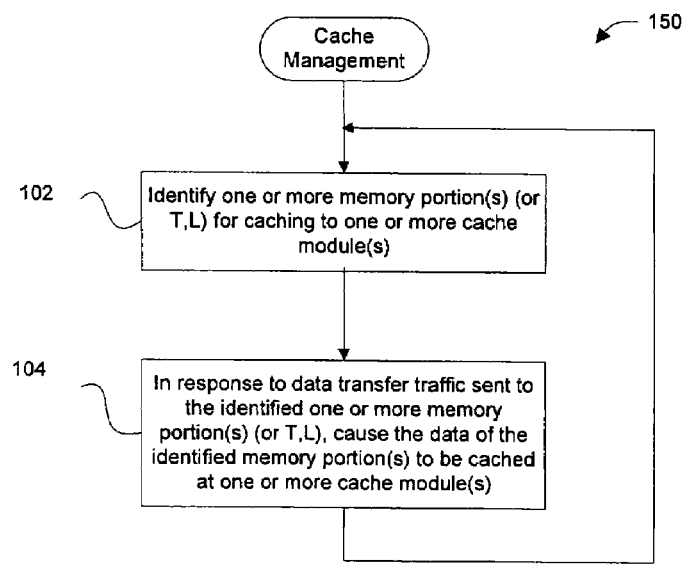
FIG. 1B is a flowchart illustrating a high level procedure for cache management in accordance with one embodiment of the present invention.

FIG. 1B is a flowchart illustrating a high level procedure 150 for cache management in accordance with one embodiment of the present invention. In general, one or more memory portion(s) of one or more storage devices may be identified for caching to one or more specified cache module(s) in operation 102. For example, a particular LUN of a particular target may be identified for caching to a particular cache module. Another LUN of a the same or a different target may be specified for caching to a same or different cache module. This identification operation may be configured in any suitable number of switches within the SAN.

In response to data transfer traffic sent to the identified one or more memory portions (or identified T, L), the data of such identified memory portions is caused to be cached at the identified one or more cache modules in operation 104. The procedure continues to repeat for the same or different caching configurations. That is, different memory portions or different cache modules may be identified for caching or the same caching scheme may be maintained until it is dismantled.

The caching configuration for providing cache services in a particular SAN may be accomplished in any suitable manner. In a switch assisted embodiment, a switch serves as a cache engine to thereby parse data I/O, manage cache metadata, perform data lookups on the cache and retrieve data from a storage device if a cache MISS occurs as explained further below. In this example, the cache module requires no intelligence for cache management and can simply be a memory device without a processor mechanism. In a switch redirected embodiment, a switch simply performs redirection for data transfer traffic and the cache module serves a cache engine. In the switch redirected embodiment, the cache module needs to include a processing mechanism for providing a cache engine (e.g., FIG. 11).

Figure 2:
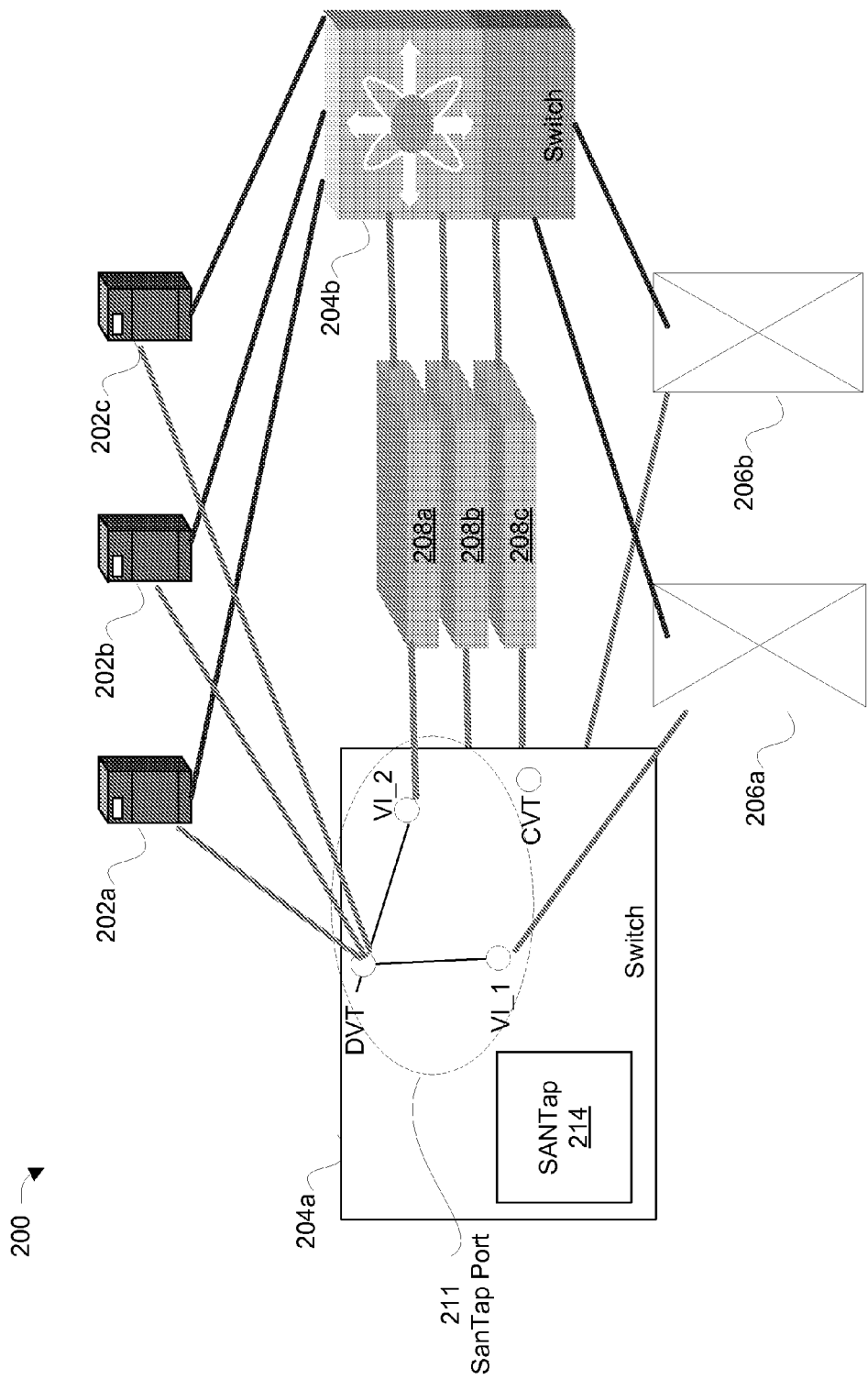
FIG. 2 is a diagrammatic representation of a network having cache services that utilize SANTap in accordance with one embodiment of the present invention.

A switch redirected approach will first be described. FIG. 2 is a diagrammatic representation of a network 200 having cache services utilizing a SANTap mechanism (as described further below) in accordance with one embodiment of the present invention. As shown, the network 200 includes a plurality of hosts 202 coupled to two switches 204a and 204b which are coupled to two mid-range storage subsystems 206a and 206b. An expanded view is given for switch 204a although switch 204b may be similarly configured. Both switches 204a and 204b are also coupled to a plurality of cache modules 208a through 208c.

Each initiator or host 202 initially may access (e.g., READ or WRITE) one of the targets 206 via switch 204a or 204b. Typically, a pair of redundant switches are used in the event of failure of one of the switches. Also, SCSI targets, such as storage disks or physical logic units (PLUNs), are directly accessible by SCSI initiators (e.g., hosts). Similarly, even when VLUNs (virtual logical units) are implemented, the VLUNs are visible and accessible to the SCSI initiators. Thus, each initiator (physical or virtual) will typically identify those PLUNs or VLUNs that are available to it. More specifically, the initiator typically determines which SCSI target ports are available to it. The initiator may then ask each of those SCSI target ports which PLUNs or VLUNs are available via those SCSI target ports. The procedures for an initiator to identify the target ports and LUNs available to it generally include various handshaking procedures for querying the switch and ports for such information.

In the illustrated example, switch 204a is configured or set up to allow cache module 208a to access or tap data flowing between host 202a and target 206a although such access may be provided for any other suitable combination of host, target, and cache. A cache module generally may be configured to rapidly store and retrieve SAN or VSAN data for various applications without requiring that the host or target perform any configuration changes to the SAN.

Such a SAN data tapping scheme is referred to herein as "SANTap" 214. Generally, SANTap is operable to allow a device to tap into the SAN or VSAN data flow for various applications and can be initiator independent. Any suitable mechanism may be used to allow a device to tap or redirect the data I/O to one or more targets. In one implementation, a software entity for handling a SANTap is configured or set up in the switch. This software entity may include one or more data virtual target (DVT) and virtual initiator (VI) pairs. In one implementation, a cache module may cause one or more DVT and VI pairs to be set up in a switch as needed. Several mechanisms for forming and handling virtual targets and virtual initiators are described further in "Cisco MDS 9000 Family Configuration Guide, Cisco MDS SAN-OS Release 1.1(1a)", Cisco Systems, Inc., January 2004, http://www.cisco.com and co-pending U.S. patent application Ser. No. 10/056,238, entitled METHODS AND APPARATUS FOR IMPLEMENTING VIRTUALIZATION OF STORAGE WITHIN A STORAGE AREA NETWORK, filed 23 Jan. 2002 by Thomas James Edsall et al. This document and patent application are incorporated herein by reference in their entirety for all purposes.

As shown in the example implementation of FIG. 2, a DVT is set up for target 206a. The target may be a virtual or real, physical device. The DVT is configured to intercept data I/O sent by any initiator 202 to the target 206. The intercepted data is then mirrored from one or two virtual initiator (VI) entities, e.g., VI_1 and VI_2 in the illustrated example. Entity VI_1 routes this data I/O to the destination or real target 206a, and VI_2 routes this data I/O to associated cache module 208a. Alternatively, data may be only sent to the cache and not the real target. The data routed to the cache may also include any combination of READ and/or WRITE data transfer traffic. This set of virtual entities (DVT, VI_1, and VI_2) may be referred to as a SANTap port 211. Several DVT and VI arrangements are further described in U.S. patent application Ser. No. 11/177,880, filed 8 Jul. 2005 by Samar Sharma et al. and U.S. patent application Ser. No. 11/361,119, filed 24 Feb. 2006 by Samar Sharma et al., which applications are incorporated herein by reference in their entirety for all purposes. This SANTap port is just one example of an entity for performing such data tapping operations and is not meant to limit the scope of the invention to a specific DVT and VI configuration.

A SANTap port may be configured using any suitable mechanism and/or configured by any suitable entity. Preferably, each cache module is operable to configure a DVT in an appropriate switch as needed for its particular application. In a specific implementation, a cache module causes the switch to set up a DVT by sending a "session create" command to the switch. As shown, a control virtual target (CVT) is first set up in the switch for receiving commands from a cache module. For example, cache module 208a specifies to the switch through such CVT various aspects of a specific SANTap. The cache module may also specify various other commands for affecting the data redirection via its CVT. By way of example, the cache module may issue commands via its CVT to set up a DVT in the switch for a particular target LUN, initiate data copying from such target LUN, cease data copying for such target LUN, quiesce, unquiesce, special behaviors, etc. In the illustrated embodiment, cache module 208a specifies through CVT that DVT is to be created so as to redirect data flowing to a specific target LUN (e.g., in target 206a). Cache module 208a may also stop the data redirection performed by such DVT. In certain aspects, a cache module configures a SANTap Port to receive data that is sent to a specified target LUN. Of course, this same process may be implemented for a range of specified target LUN's.

Figure 3:
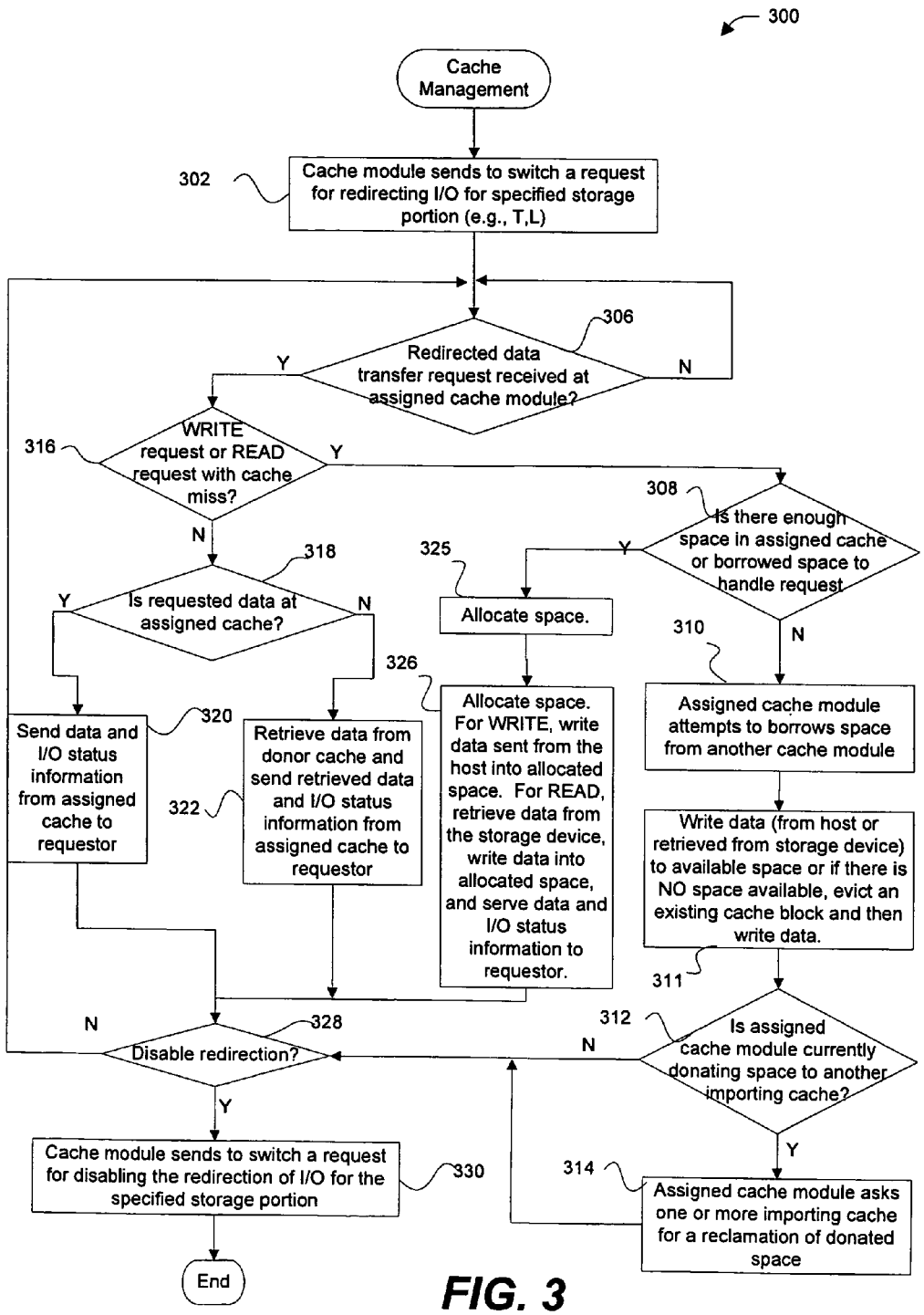
FIG. 3 is a flowchart illustrating a procedure for implementing cache management using SANTap in accordance with one implementation of the present invention.

FIG. 3 is a flowchart illustrating a procedure 300 for implementing cache management using SANTap in accordance with one implementation of the present invention. The following operations are performed by a cache module in communication with a SAN switch to accomplish redirection of data transfer traffic for a particular storage portion of a particular storage device (or T,L) to the requesting cache module. Of course, this process may be repeated by the same cache module for any number of storage portions of the same or different storage device. Additionally, each cache module may implement a similar process for dynamically caching different memory portions of different or the same storage device.

Initially, a cache module sends to a switch a request for redirecting I/O for a specified storage portion of a particular storage device, such as a mid-range storage device, (or T,L) in operation 302. The requesting cache module may then be defined as the "assigned" cache for the specific storage portion (or T,L). READ and WRITE requests for the specified storage portion are then redirected by the switch to this assigned cache module for caching purposes until redirection for such specific storage portion is disabled by the assigned cache module. Other types of traffic may be handled by the switch in any suitable manner and do not require redirection to a cache module. For example, the switch may continue to handle other requests for initiating or disabling SANTap for a particular storage portion (or T,L) by a same or different cache module.

The assigned cache module waits for a redirected data transfer request to be received in operation 306. Alternatively, request handling may be triggered by an interrupt that occurs when a redirected data transfer request is received. When a redirected data transfer request is received, it may first be determined whether the request is a WRITE request or a READ request with a cache miss in operation 316. A WRITE request occurs when a host is attempting to write data into the storage device and a cache miss occurs when READ data is not located at the assigned cache or in a borrowed space of another cache. If such a request is received, it may be determined whether there is enough space in the assigned cache module or enough borrowed space available from another cache module to handle the data transfer request (i.e., for writing the data of the current WRITE request or retrieving data for a cache miss of the current READ request) in operation 308. For example, the assigned cache may use its own space or use space that was previously borrowed space from another cache, which borrowing process is further described below.

If there is enough space, space is allocated for the request in operation 325. For a WRITE, data from the host is written into the allocated space of the assigned cache or, for a READ request with a cache miss, data is retrieved from the storage device, written into the allocated space of the assigned cache, and served (along with IO information) to the host or requestor in operation 326.

If there is not enough space, the assigned cache module may attempt to borrow space from another cache module in operation 310. While the borrowing operation is pending, data (from host or retrieved from storage device) may begin to be written into available space of the assigned cache module or if there is no space available, an existing cache block may be evicted and then data written into the newly available space in operation 311.

An importing cache who is attempting to borrow the space from a donor cache may accomplish this task in any suitable manner. For example, the importing cache first sends a message to the potential donor asking whether the importing cache can borrow from the potential donor and specifying how much memory is needed, e.g., memory size, memory minimum, and/or memory maximum. The potential donor may then respond that it cannot donate such space or that it can donate space. When the donor is capable of donating the requested space, the response from the donor also contains a reference or pointer to the donated space so that the importing cache may utilize such space from the donor cache.

If there is not enough space in the assigned cache, it may also be determined whether the assigned cache module is currently donating space to another importing cache in operation 312. If the cache module is donating space, the assigned cache module may ask the importing cache for a reclamation of donated space by one or more importing cache modules in operation 314. For example, if the assigned cache is donating a first memory portion to a first importing cache and a second memory portion to a second importing cache, it may ask one or both of the importing caches to reclaim their borrowed space. Ideally, each importing cache reclaims its borrowed memory as quickly as possible when requested to do so.

When a WRITE request or a READ request with a cache miss (i.e., cache hit) does not occur, it may then be determined whether the requested data is located at the assigned cache in operation 318. Instead, the requested data may have been previously cached in a borrowed space of a donor cache module as described above. If the requested data is located at the assigned cache, the requested data, as well as I/O status information, is sent from the assigned cache to the requester in operation 320. If the requested data is not located at the assigned cache, the data is retrieved from the donor cache and this retrieved data, as well as I/O status information, is then sent from the assigned cache to the requester in operation 322.

At any point in the caching management procedure, a particular assigned cache may be configured to disable redirection for one or more of its assigned memory portions or T,L flows. That is, redirection may be disabled for any of the memory portions (or T,L's) of any storage device. This disablement may be accomplished in any suitable manner. In the illustrated example, after an assigned cache has handled a READ or WRITE request for a specified memory portion (or T,L), it may then determine whether it is to disable redirection for such specified memory portion (or T,L) in operation 328. If disablement is to occur, the assigned cache then sends to switch a request for disabling the redirection of I/O for the specified storage portion (or T,L) operation 330. The procedure for cache management with respect to this specified memory portion (or T,L) then ends. Otherwise, the operation for disablement is skipped and the assigned cache continues to handle any READ or WRITE requests for this specified memory portion (or T,L) at operation 306.

At any point in the process, it may be determined whether redirection is to be disabled for the specified memory portion (or T,L) As shown, it is determined whether redirection is to be disabled in operation 328. If redirection is to be disabled, the assigned cache may send a request to the switch to disable the redirection, e.g., SANTap, for the specified memory portion (or T,L) in operation 330 and the cache handling ends at least with respect to this specified memory portion (or T,L). If redirection is not to be disabled, the cache continues to wait for data transfer request in operation 306.

Figure 4:
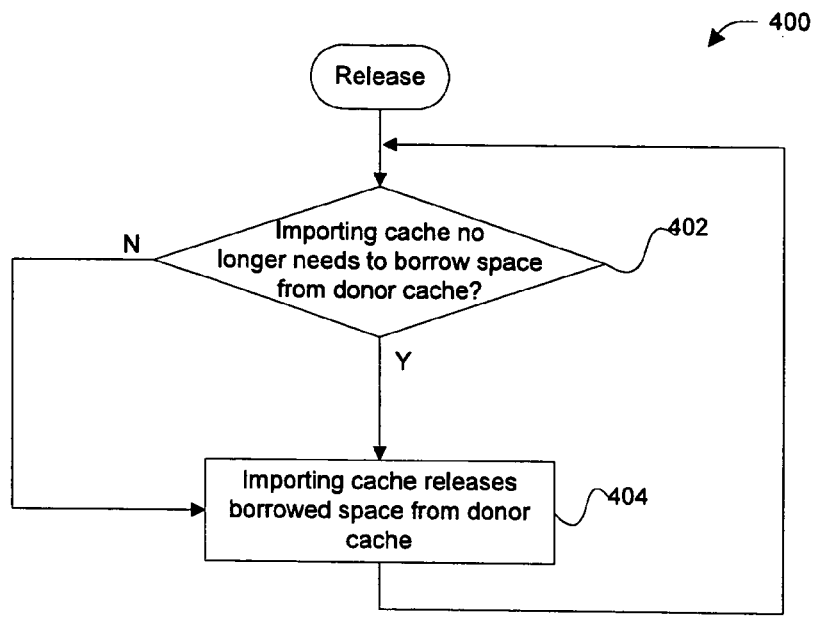
FIG. 4 is a flowchart illustrating a procedure for performing a cache release operation in accordance with one aspect of the present invention.

Cache management may also include mechanisms for handling borrowed space with respect to a importing cache. FIG. 4 is a flowchart illustrating a procedure 400 for performing a cache release operation in accordance with one aspect of the present invention. Initially, it is determined whether an importing cache no longer needs to borrow space from a donor cache in operation 402. For instance, the importing cache may determine that its memory usage has fallen below a predetermined level. If the answer is yes, the importing cache releases any amount of borrowed space from a donor cache in operation 404. Of course, the cache only releases as much space as it can without having its memory usage go above the predetermined level. Otherwise, if the importing cache needs to continue borrowing space from a donor cache, this release operation is skipped. This procedure 400 may be repeated periodically.

Figure 5:
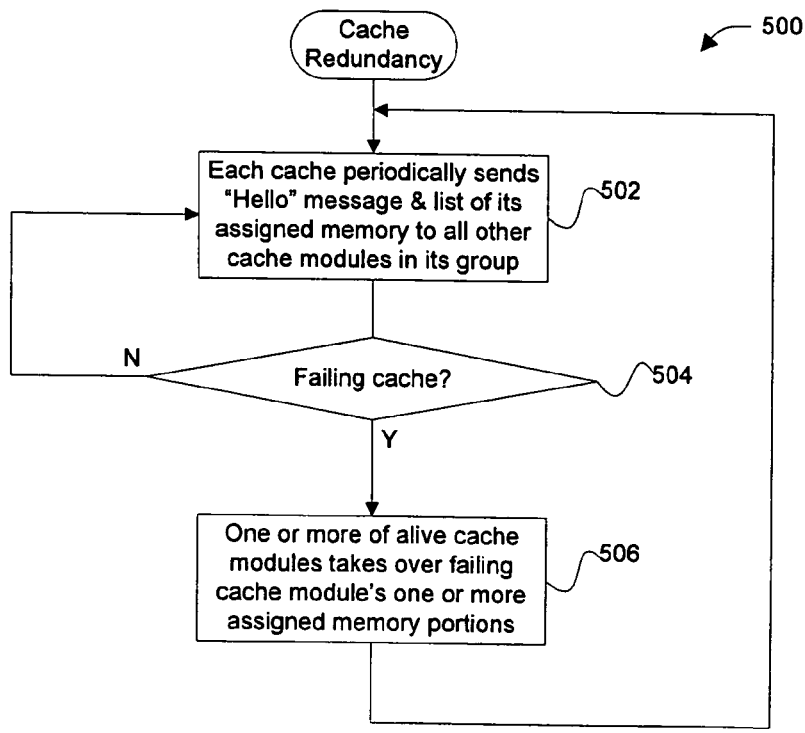
FIG. 5 illustrates a procedure for implementing cache redundancy in accordance with a specific embodiment of the present invention.

Cache management may also include mechanisms for providing cache redundancy in the event of a cache module failure. FIG. 5 illustrates a procedure 500 for implementing cache redundancy in accordance with a specific embodiment of the present invention. Initially, each cache periodically sends "hello" messages and a list of its assigned memory to all other cache modules in its group in operation 502. A hello message merely indicates that the sending cache is still active and has not failed. A hello message is also commonly referred to as a heartbeat. It may also be determined (in parallel or sequentially with the sending of a heartbeat) whether a cache is failing in operation 504.

If a cache is failing, one or more of the still active or alive cache modules can then takeover for the failing cache module's one or more assigned memory portions (or T,L's) in operation 506. Any suitable takeover procedure may be implemented. In one example, the cache module with the highest identifier value takes over for the failing cache first. If the cache with the highest identifier value cannot take over, the cache having second highest identifier value takes over for the failing cache. The caches either inform each other about or are configured with each others' identifiers. This redundancy procedure 500 may be repeated periodically.

FIG. 6A is a communication diagram illustrating a procedure for handling a READ I/O request for a cache hit in accordance with one use example of the present invention. The devices of FIG. 2 are used in this communication diagram. The following communication diagrams are simplifications of the types of messages sent for a data transfer. Of course, a typical transfer will include further message exchanges to indicate various states, such as to indicate a memory device/cache is ready for data receipt or to acknowledge that data has been read or received (or written) correctly.

As shown in FIG. 6A, host 202a sends a READ request that is destined for storage device 206a via path 602 and is intercepted by SANTap 214 (of switch 204a). SANTap 214 has been previously configured to redirect such request to cache module 208a along path 604. The cache module 208a is able to retrieve the requested data from its own memory since the redirection was set up prior to a data WRITE to such requested location. Hence, cache module 208a responds by sending the requested data from itself back to the SANTap 214 along path 608, which is then forward to the requesting host 202a via path 606. The cache module may also send I/O status information, for example, via paths 612 and 610 through SANTap 214 to host 202a. Of course, the I/O status information may be sent in conjunction with the data.

Figure 6B:
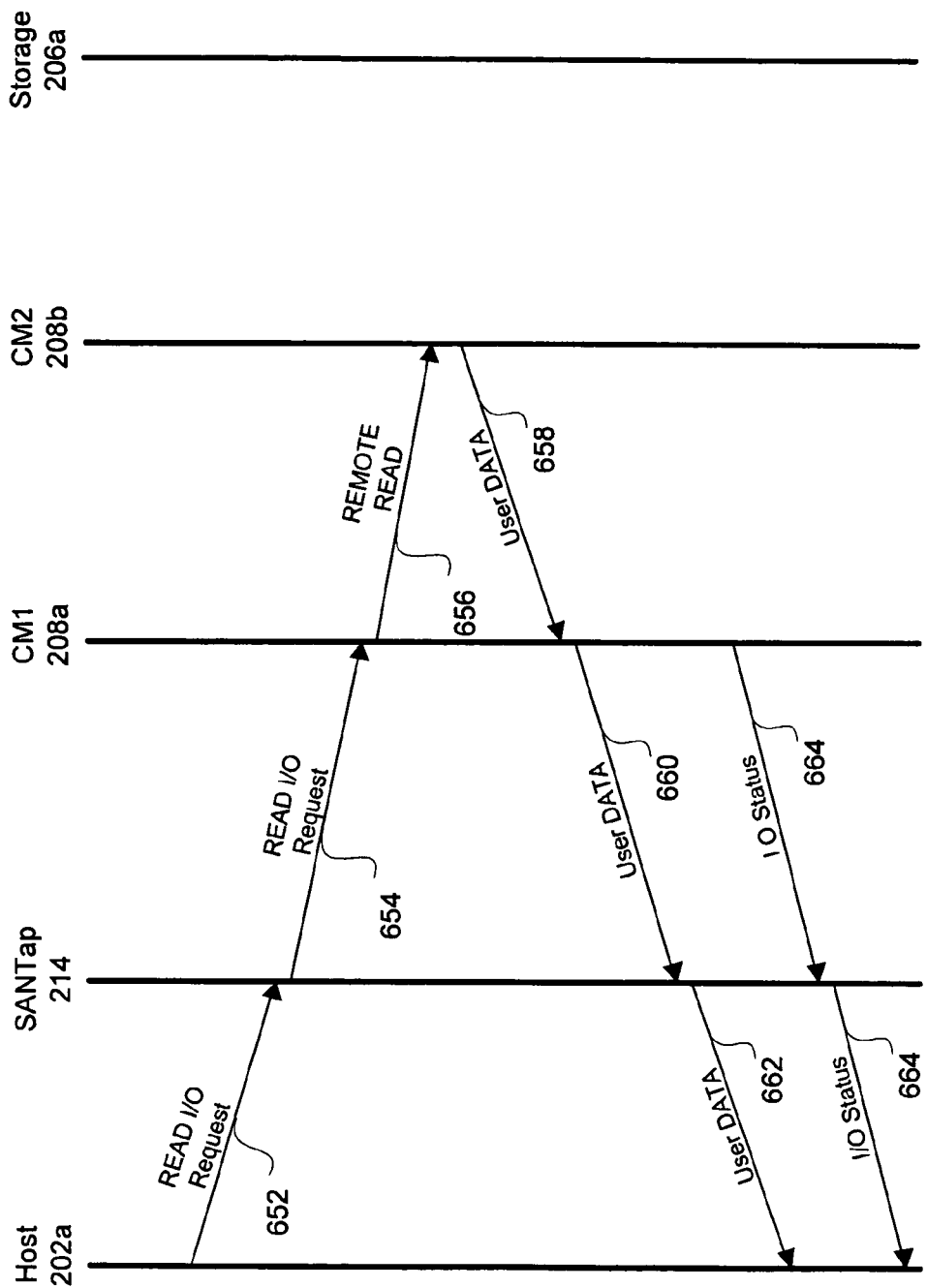
FIG. 6B illustrates a communication diagram illustrating a procedure for handling a READ request for a cache hit for an imported cache in accordance with a second implementation of the present invention.

FIG. 6B illustrates a communication diagram illustrating a procedure for handling a READ request for a cache hit for an imported cache in accordance with a second use example of the present invention. As shown, host 202a sends a READ request via 652 to SANTap 214 of switch 204a. SANTap forwards this request to assigned cache module 208a. In this case, the requested data is located in a borrowed memory space of a donor cache module 208b. Thus, cache module 208a performs a remote READ 656 from donor cache module 208b to retrieve the requested data 658. After retrieval, the requested data is then sent via paths 660 and 662 through SANTap 214 to the requesting host 202a. I/O Status information is also sent to the host 202a along paths 664.

Figure 6C:
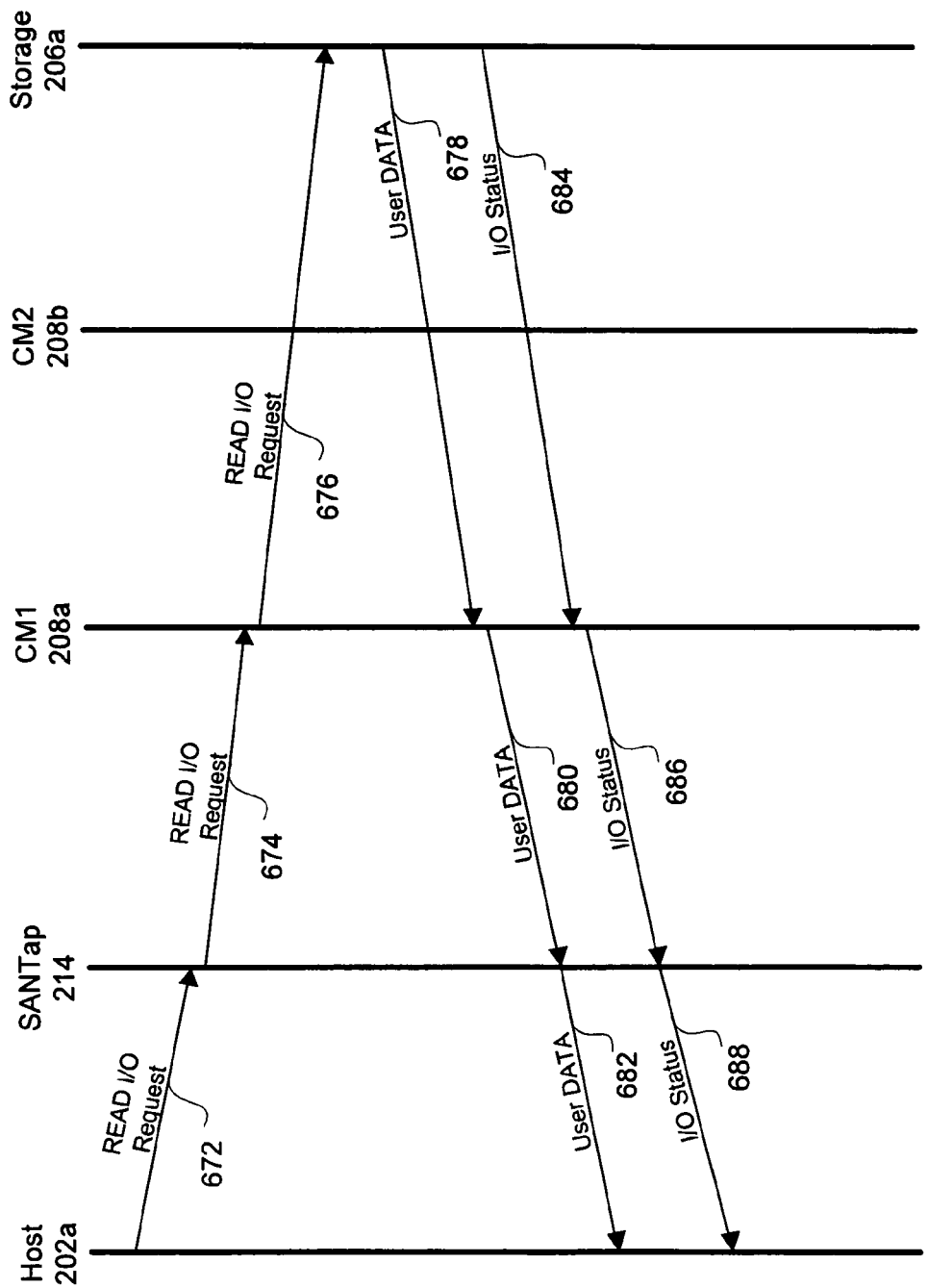
FIG. 6C is a communication diagram illustrating a procedure for handling a READ request for a cache miss in accordance with a third application of the present invention.

FIG. 6C is a communication diagram illustrating a procedure for handling a READ request for a cache miss in accordance with a third use example of the present invention. As shown, a READ request 672 is sent from host 202a to SAN-Tap 214, which redirects such request to the assigned cache module 208a. When the assigned cache 208a determines that the data is not located in its own or another cache's borrowed memory, the data is retrieved from the original storage device 206a via 676. The storage device 206a responds with user data 678 that is sent to the assigned cache 208a. Upon receipt of the requested data, the assigned cache 208a forwards the requested data through SANTap 214 to the requesting host 202a via paths 680 and 682. I/O status information may also be similarly retrieved and forwarded along paths 684, 686, and 688 to host 202a.

SANTap is not the only mechanism that can be utilized to redirect data transfer traffic to a cache device. In another embodiment, the SCSI-Flow services infra-structure on MDS platforms by Cisco Systems, Inc. of San Jose, Calif. may be utilized to provide a SCSI-Flow Cache service. This SCSI-Flow Cache service would be operable to trap all data transfer traffic destined to a given SCSI-Target and redirect the same to the optimal amount of storage-cache allocated from high-end cache devices in the network, for example.

Currently, a given SCSI-Flow is defined for an {Initiator, Target} pair as follows:

```
conf t
scsi-flow flow-id <flow-id> initiator-vsan <vsan> initiator-pwwn <pwwn>
    target-vsan <vsan> target-pwwn <pwwn>
end
```

The above can be enhanced to configure a SCSI-Target based SCSI-Flow with Cache service enabled as follows:

```
conf t
scsi-flow flow-id <flow-id> target-vsan <vsan> target-pwwn <pwwn>
    [cache-target-vsan <vsan> cache-target-pwwn <pwwn>]
scsi-flow flow-id <flow-id> cache-enable
end
```

When a particular cache-target is identified for a particular target and LUN and cache services are enabled, mechanisms for caching may be set up for the identified target/LUN. In one implementation, a wild card TCAM or SRAM entry (WC-TI) is set up at the applicable TI port where the identified target is connected. One of the flags in the WC-T1 mapped TCAM or SRAM entry would have the cache feature bit enabled. The TI port then starts snooping SCSI traffic sourced from a SCSI-Initiator HI and destined to the identified SCSI-Target TI via WC-TI. When such traffic is encountered, caching is then implemented for such traffic as described further below.

Data IO from the initiators to the SCSI-Target specified in the above SCSI Flow configuration command would be cached via a Cache-SCSI-Target-port which presents an opportunity to offer network based Cache services using high-end Cache devices in the market, for example. Users would optionally be given a choice to specify which high-end Cache devices to use. Otherwise, a SCSI-Flow Manager process which accepts SCSI-Flow configuration commands would be in a position to allocate the appropriate storage from high-end Cache devices pool in the network.

Several terms will be defined with respect to this SCSI Flow embodiment: H1 denotes a SCSI-Initiator; H1-port denotes an intelligent portion (1-port) connected to H1; T1 denotes a SCSI-Target; T1-port denotes an I-port connected to T1; C-T1 denotes Cache SCSI-Target; C-T1-port denotes an I-port connected to C-T1; V1 denotes a Virtual-N-port to access C-T1& T1; NAT denotes Network-Address-Translation for performing translations on data sources and destination identifiers for redirection of such data to a cache device.

Figure 7:
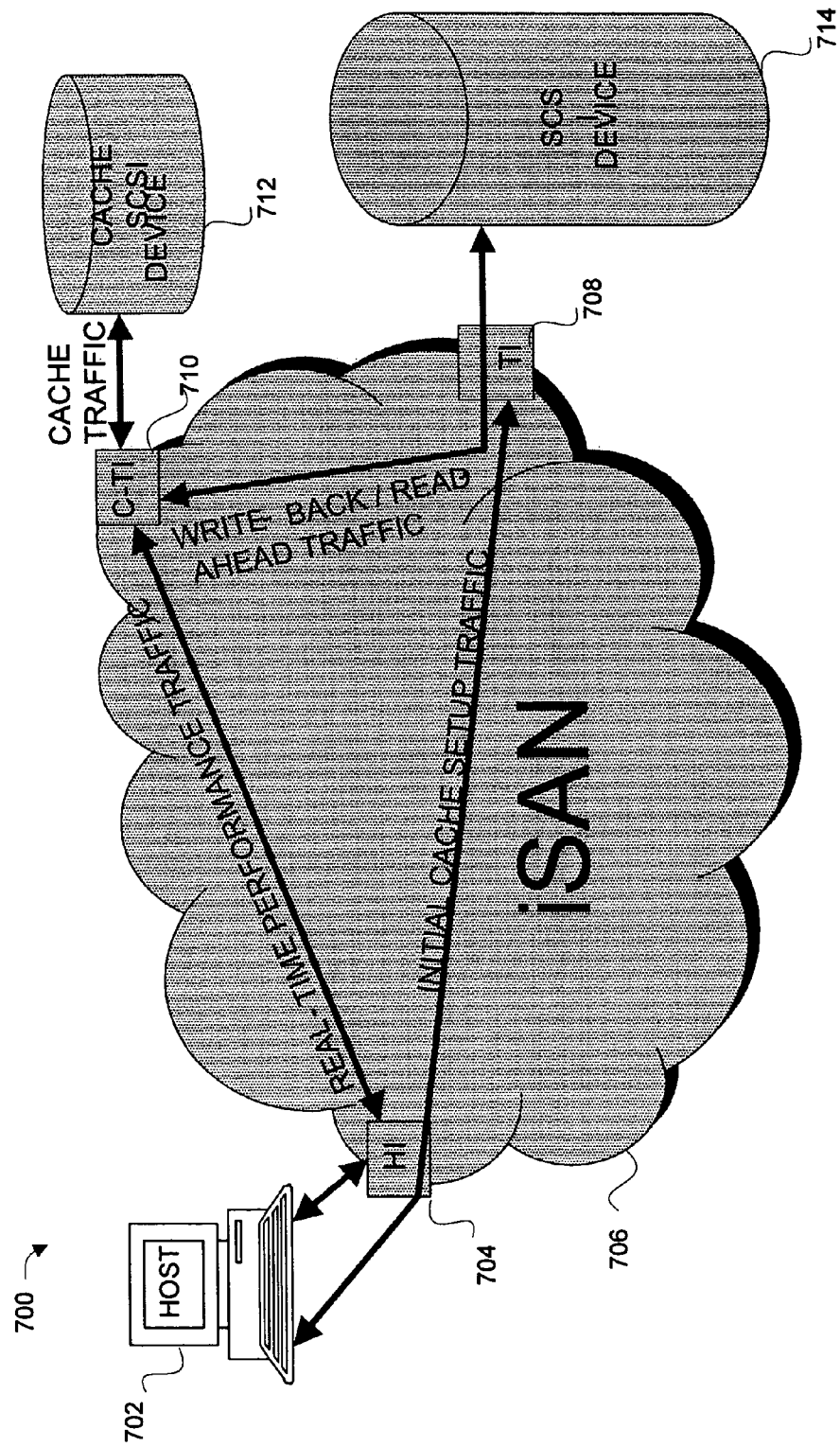
FIG. 7 is a diagrammatic representation of a network implementing cache services that utilize SCSI-Flow in accordance with an alternative embodiment of the present invention.

FIG. 7 is a diagrammatic representation of a network 700 in accordance with a SCSI-Flow embodiment of the present invention. As shown, the network 700 includes a host 702 in communication with both a cache SCSI device 712 and a SCSI device 714 via an intelligent storage area network (iSAN). In general, the SCSI device 714 may be any type of long term, inexpensive storage device, for example, with a relatively large storage capacity, while the cache SCSI device 712 can be a high end cache device, such as available from EMC, Hitachi, etc. Ideally, a user's database would be housed on the inexpensive SCSI device 714, while flexibly using the high-end cache device 712 for frequently accessed data.

The host communicates with the iSAN through a host intelligent port HI 704. The host 702 may direct READ and WRITE I/O to the SCSI device 714 via a target intelligent port TI 708, which is coupled to such SCSI device 714. In one implementation, the cache 712 is used only for memory that is needed by the host 702. When host 702 initially communicates with TI 708 of SCSI device 714, an initial cache set up procedure for I/O traffic from the host is performed. In this set up procedure, a cache target intelligent port C-TI 710 is set up for the cache SCSI device 712 and I/O traffic is trapped at the HI port and redirected to such C-TI. This set up results in real time performance traffic between HI 704 and C-TI 710, as well as write back and read ahead traffic between C-TI 710 and TI 708.

Figure 8A:
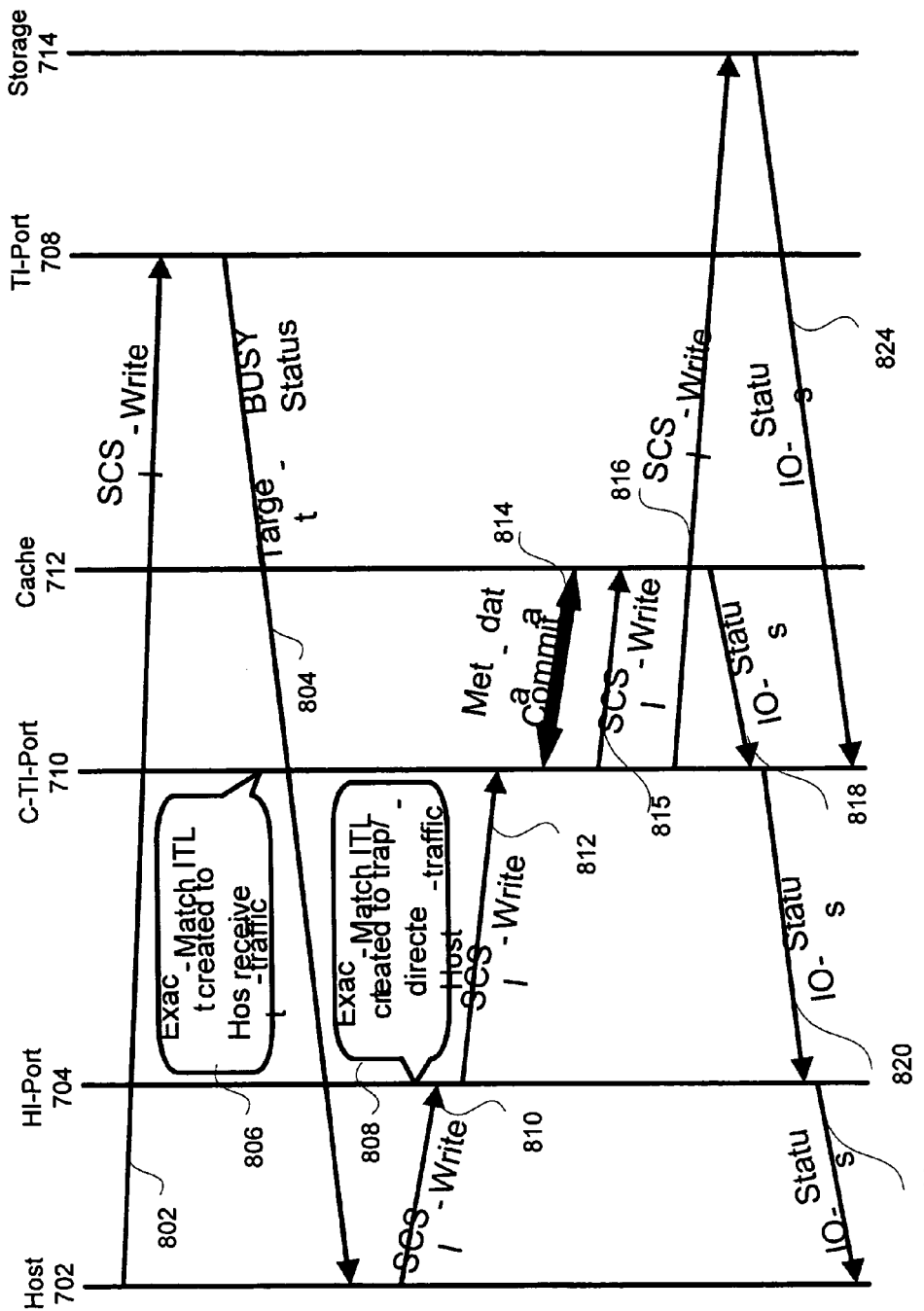
FIG. 8A is a communication diagram showing the setup and use of redirection of WRITE traffic to a cache that results in a miss in accordance with one application of the present invention.

FIG. 8A is a communication diagram showing the setup and use of redirection of WRITE traffic to a cache that results in a miss in accordance with one application of the present invention. The devices of FIG. 7 are used as examples in this communication diagram. The following redirection operations may be triggered by events occurring at a particular intelligent port, and such intelligent ports and redirections operations may be implemented separately or together in any number of network devices or switches of the SAN.

As shown, host 702 initially sends a WRITE request 802 to TI-Port 708 which is associated with SCSI device 714. If cache redirection has been enabled for the particular flow to which the write request belongs, a "Target-BUSY status" message 804 is sent back to the initiator of the WRITE request. For instance, a SCSI Flow may have been identified for a particular initiator, target, and LUN and cache services enabled for such SCSI flow as described above.

An Exact-Match ITL SCSI-Flow 808 to trap and redirect host traffic for a particular flow (initiator/I, target/L, and LUN/L) may be created on the corresponding HI-Port 704, and an Exact-Match ITL SCSI-Flow 806 to receive host traffic after it is redirected may be created on C-TI-Port 710. In addition, a virtual initiator (VI) Port may also be created on the C-TI-Port 710 to serve as an initiator to the SCSI targets of C-TI and TI. Of course, these configuration operations may be performed at any time, such as upon receipt of a SCSI-Flow message to enable cache services for a particular flow. This VI may perform aPLOGI to the C-TI and discover the LUN's behind the C-TI in order to utilize storage provided by the C-TI-LUN's as cache.

Thus, when a next WRITE request 810 is sent by Host 701 to the same target LUN through its HI-Port, this WRITE request is trapped and a NAT operation is performed so as to redirect the WRITE request to cache device 712 via C-TI-Port 710 (see WRITE request 812 to C-TI-Port 710 and WRITE request 815 to cache device 712). For instance, the Fibre Channel identifier (FCID) of the destination TI is replaced with the FCID of C-TI-Port. The VI Port sends this translated WRITE request to the cache 712 via C-TI-Port 710. A Meta-data Commit exchange 814 that includes a mapping table may also be sent between the C-TI-Port 710 and cache 712 to specify which memory blocks are to be utilized in the cache for the particular requested memory write. The VI Port also may be configured to send a WRITE request 816 to the storage device 714 via the TI-Port 708.

Both the cache 712 and storage device would send IO Status information back through the C-TI-Port. Preferably, only the cache's IO Status information is sent back to the host 702 (via signals 820 and 822). However, it is conceivable that the storage device's 714 IO Status Information may be alternatively sent to the host 702. In either case, if the IO status information indicates a WRITE failure the VI Port may again attempt to send the WRITE request or data that was not received by the cache or storage device.

Figure 8B:
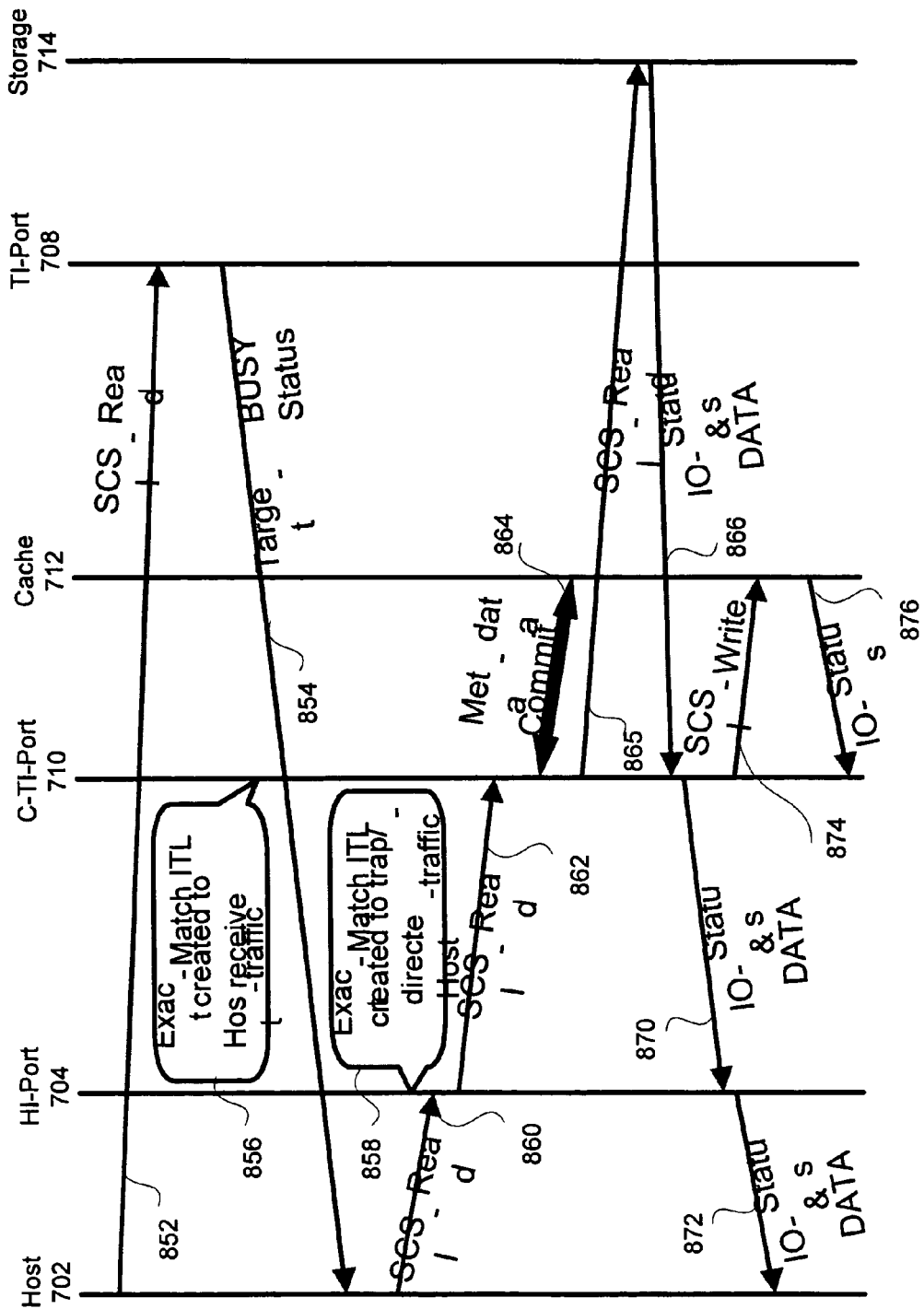
FIG. 8B is a communication diagram illustrating showing the setup and use of redirection of READ traffic to a cache that results in a miss in accordance with one example application of the present invention.

FIG. 8B is a communication diagram illustrating showing the setup and use of redirection of READ traffic to a cache that results in a miss in accordance with one example application of the present invention. In this example, host 702 sends a READ request 852 to TI-Port 708, which responds with a "Target-BUSY Status" message 854. An Exact Match ITL 856 to receive host traffic is created at C-TI-Port 710, while an Exact Match ITL 858 to trap and redirect host traffic is set up at HI-Port 704.

Host 702 then sends a READ request 860 though its HI-Port 704, which entraps the READ request. The HI-Port 704 then redirects a READ request 862 to the C-TI Port 710 of the cache device 710. Another Meta-data Commit exchange 864 may also occur for mapping purposes.

If the cache 712 does not contain the requested READ data, a READ request 865 is sent to the storage device to thereby retrieve the READ data (and IO-Status information) 866. This data is written to the cache via WRITE 874 and an IO Status response 876 is received by C-TI-Port 710. If the IO Status information indicated a failed WRITE, another WRITE to the cache attempt may be performed. The retrieved READ data (and IO Status information) 870 and 872 is also sent to the host 702 by the C-TI-Port 710.

Figure 8C:
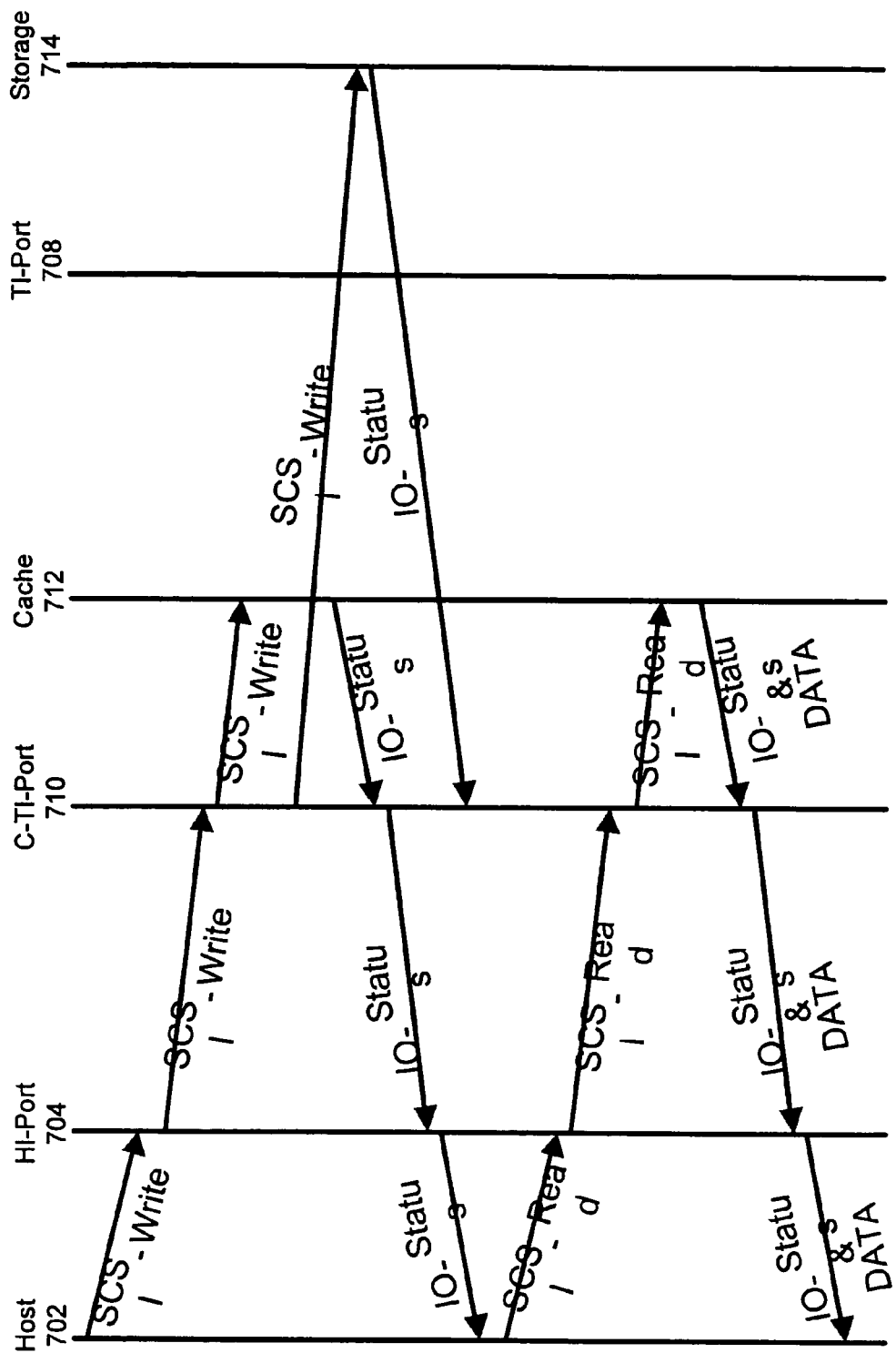
FIG. 8C is a communication diagram illustrating redirection of READ and WRITE traffic to a cache that results in a hit in accordance with another example of the present invention.

FIG. 8C is a communication diagram illustrating redirection of READ and WRITE traffic to a cache that results in a hit in accordance with another example of the present invention. These communication sequences represent the signaling which may occur after an initial READ or WRITE request is sent for the particular identified SCSI-Flow. When a WRITE is received by the HI-Port 704, it is redirected to the C-TI-Port 710 of the cache. The VI then sends the WRITE to the cache 712, as well as the storage device 714. When a READ is received by the HI-Port 704, it is redirected to the C-TI-Port 710 and cache 712. Read data is retrieved from the cache and sent to the host 702 via C-TI-Port and HI-Port 704.

Figure 9A:
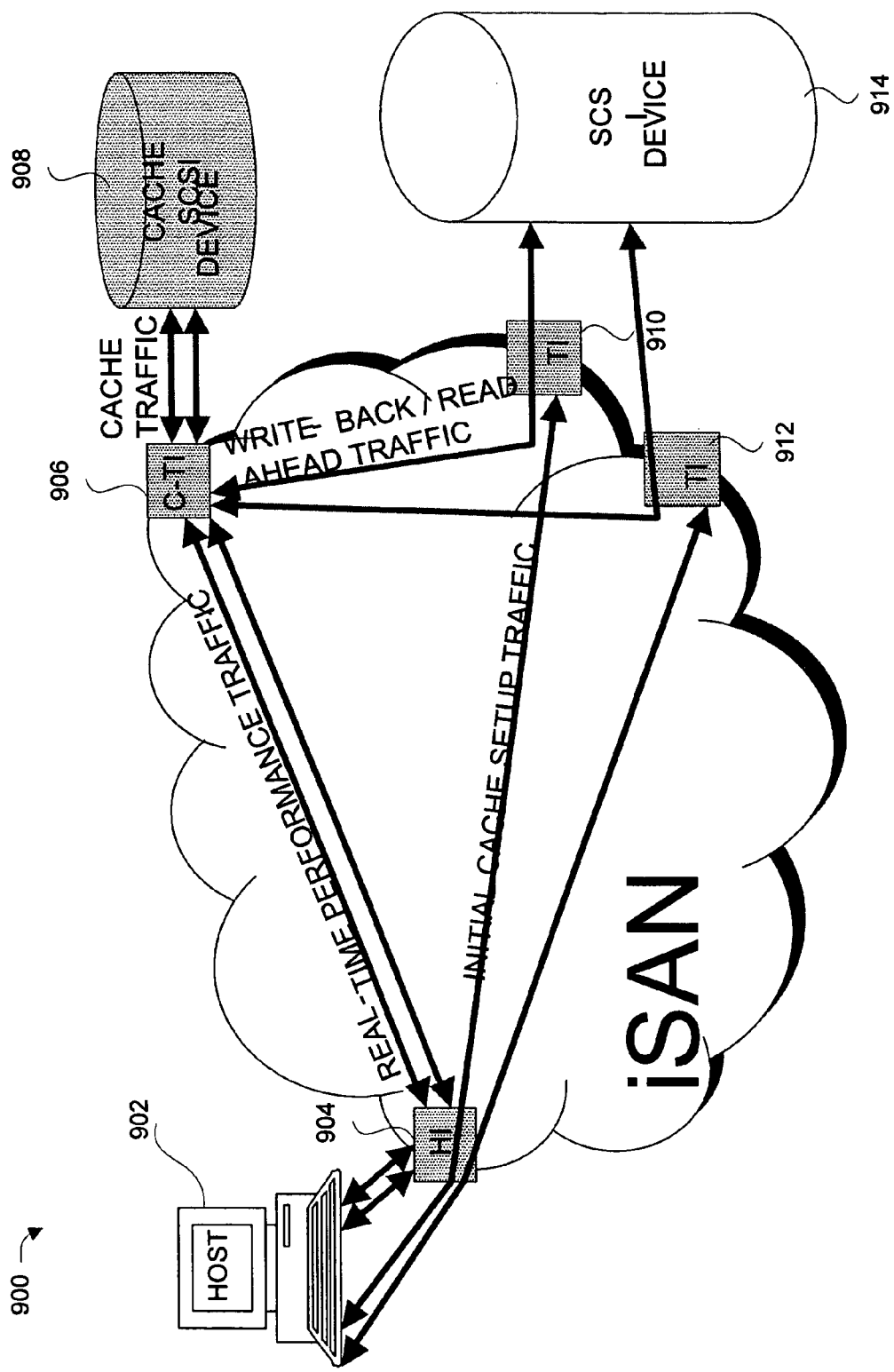
FIG. 9A is a diagrammatic representation of a one-to-many host to target arrangement in accordance with a first example.

FIG. 9A is a diagrammatic representation of a one-to-many host to target arrangement in accordance with a first example. In this example, more than one TI port may be set up for the storage device. For example, a first TI port 910 may be set up for a first memory portion (or T,L) of storage device 914, while a second port TI 912 is set up for a second memory portion (or T,L) of storage device 914. Data transfer traffic directed to both TI ports may be redirected to the same C-TI port 906 of cache 908. When the host 902 write to the first memory portion (or T,L) via TI 910, it is redirected to C-TI port 906. When the host 902 write to the second memory portion (or T,L) T1 912, it is also redirected to C-TI port 906.

Figure 9B:
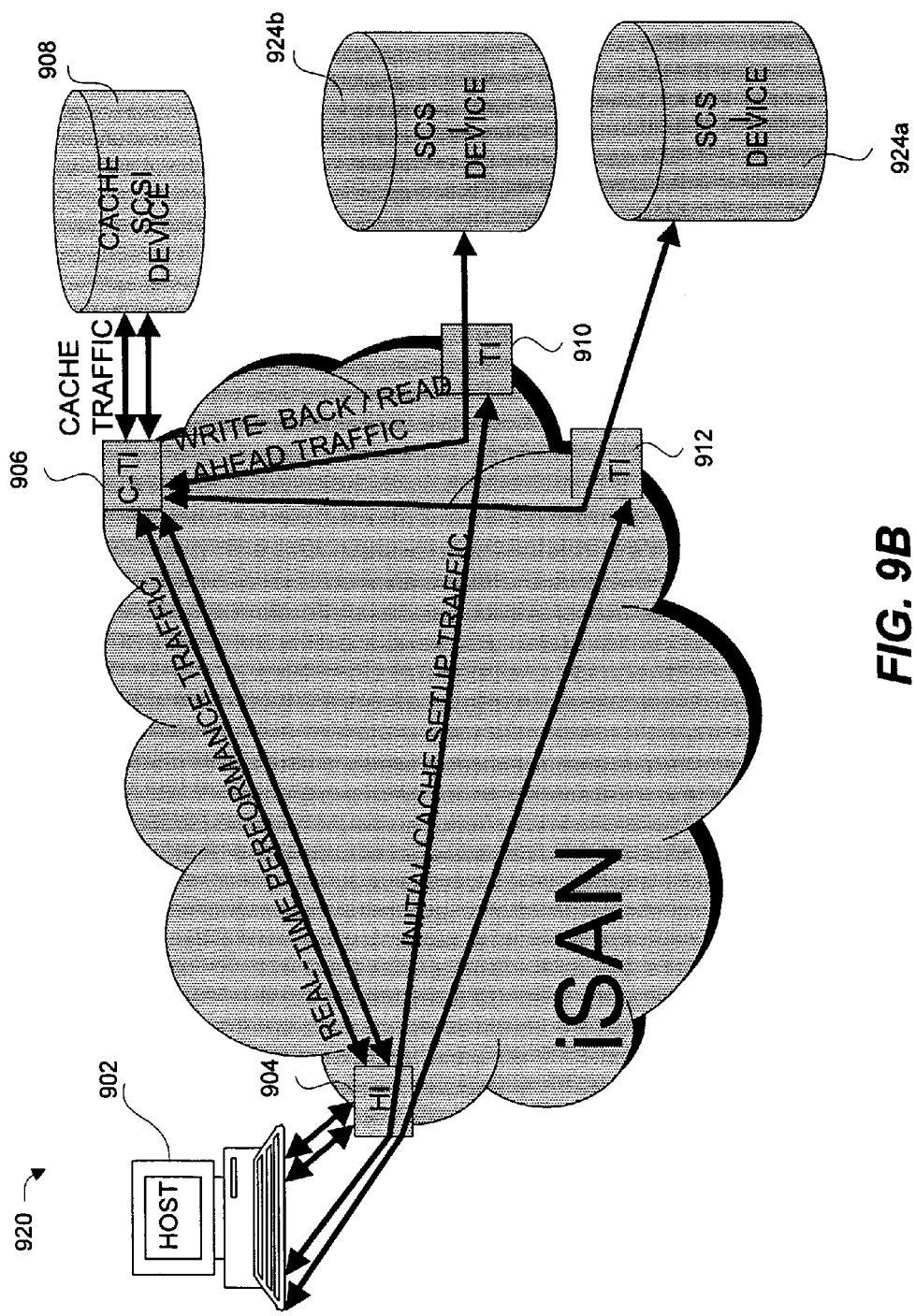
FIG. 9B is a diagrammatic alternative representation of a one-to-many host and target arrangement in accordance with a second example.
Figure 9C:
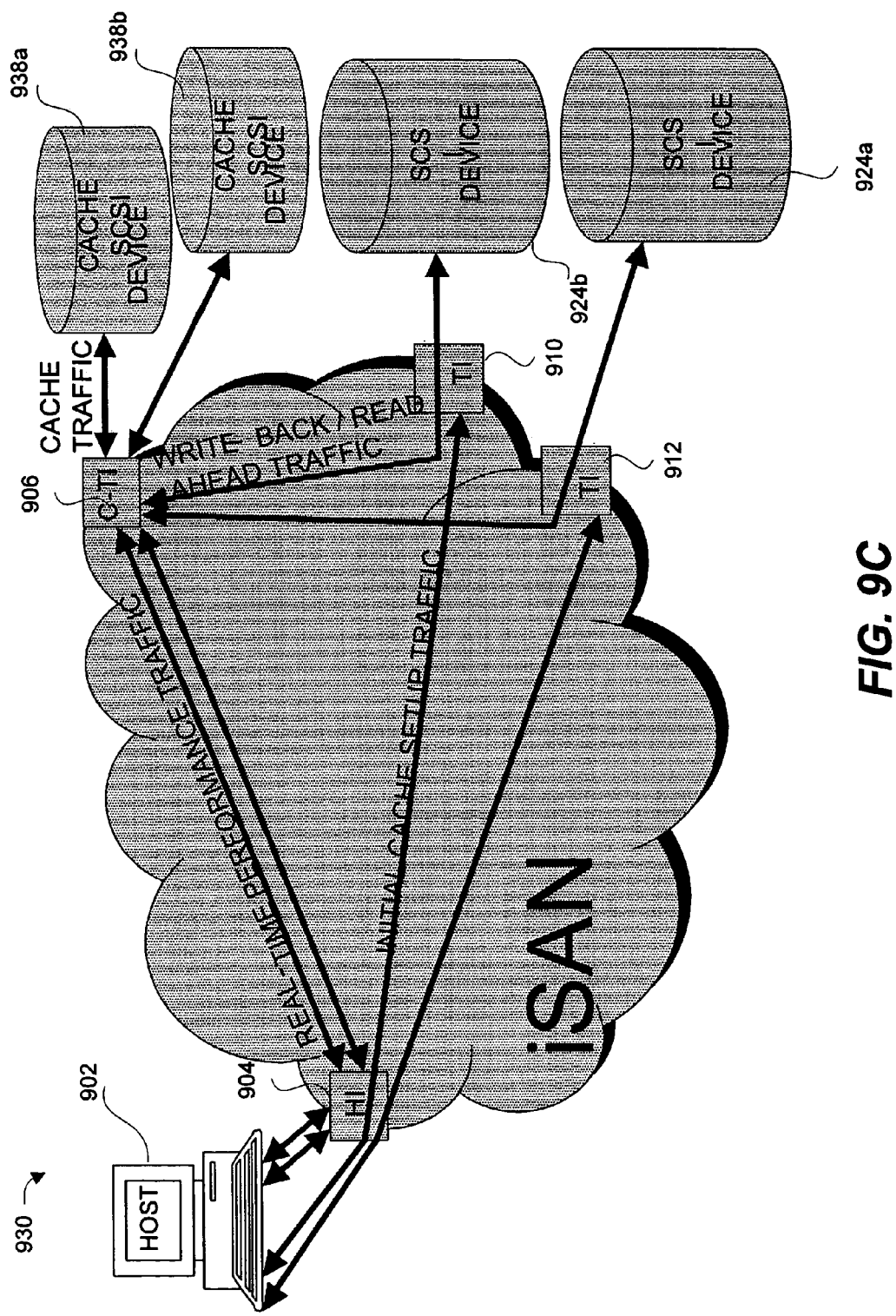
FIG. 9C is a diagrammatic representation of a one-to-many host and target arrangement in accordance with a third example.

FIG. 9B is a diagrammatic alternative representation of a one-to-many host and target arrangement in accordance with a second example. In this example, the first TI 910 is coupled to a different storage device 924b than the second TI port 912, which is coupled to storage device 924a. Data traffic sent to both targets 924a and 924b via TI ports 912 and 910, respectively, are sent to the same C-TI port 906 and cache device 908. FIG. 9C is a diagrammatic representation of a one-to-many host and target arrangement in accordance with a third example. In this example, two cache devices 938a and 938b are used to handle the traffic between host 902 and storage devices 924a and 924b. The traffic for such targets 924a and 924b may be apportioned in any suitable manner between the two cache devices 938a and 938b via C-TI port 906.

Figure 9D:
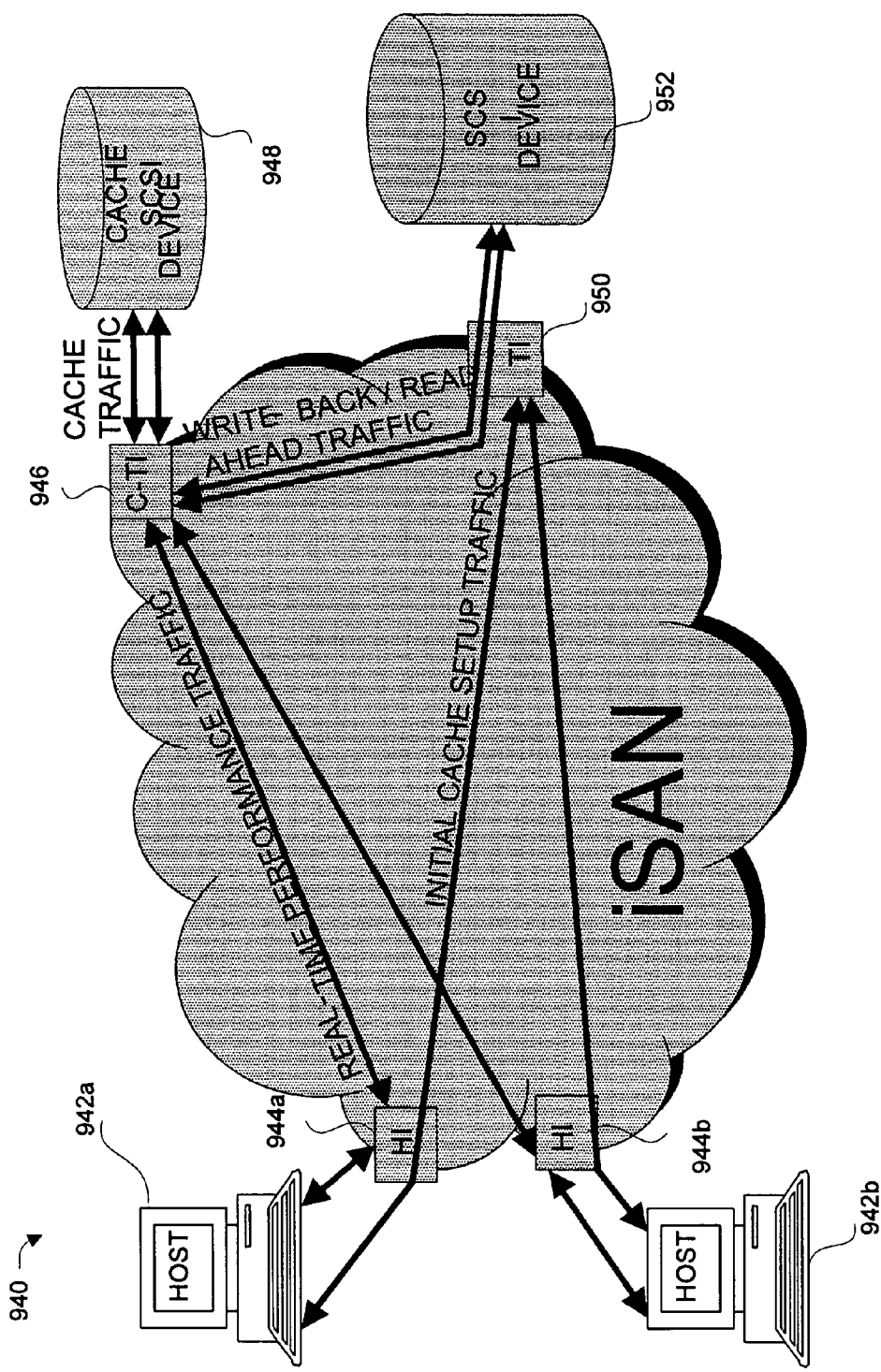
FIG. 9D is a diagrammatic representation of a many-to-one host and target arrangement in accordance with another embodiment.

FIG. 9D is a diagrammatic representation of a many-to-one host and target arrangement in accordance with another embodiment. In this example, a first host 942a is coupled to a first HI port 944a, while a second host 942b is coupled to a second HI port 944b. Both hosts 942 communicate with the same storage device 952, which is coupled with TI port 950. A same C-TI port 946 may handle and provide cache services for traffic between either host 942a or 942b and storage device 952.

Figure 9E:
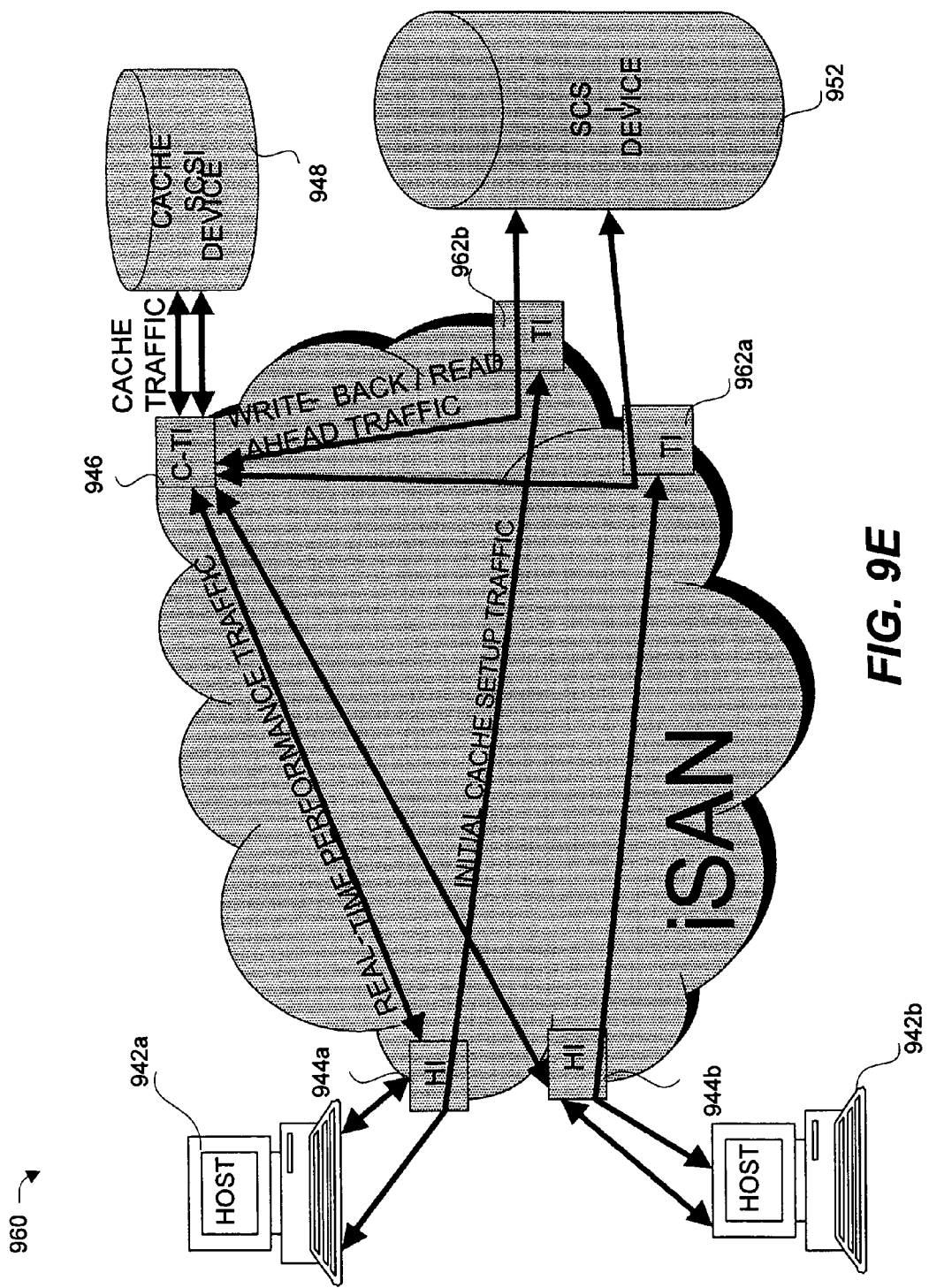
FIG. 9E is a diagrammatic representation of a many-to-many host and target arrangement in accordance with a first example.

FIG. 9E is a diagrammatic representation of a many-to-many host and target arrangement in accordance with a first example. In this example, the two hosts 942 are accessing two different memory portions of storage device 952 via two different TI ports 962a and 962b. Traffic sent from one or both hosts to either one or both of these two different TI ports 962 may be redirected to C-TI 946 for caching in cache 948.

Figure 9F:
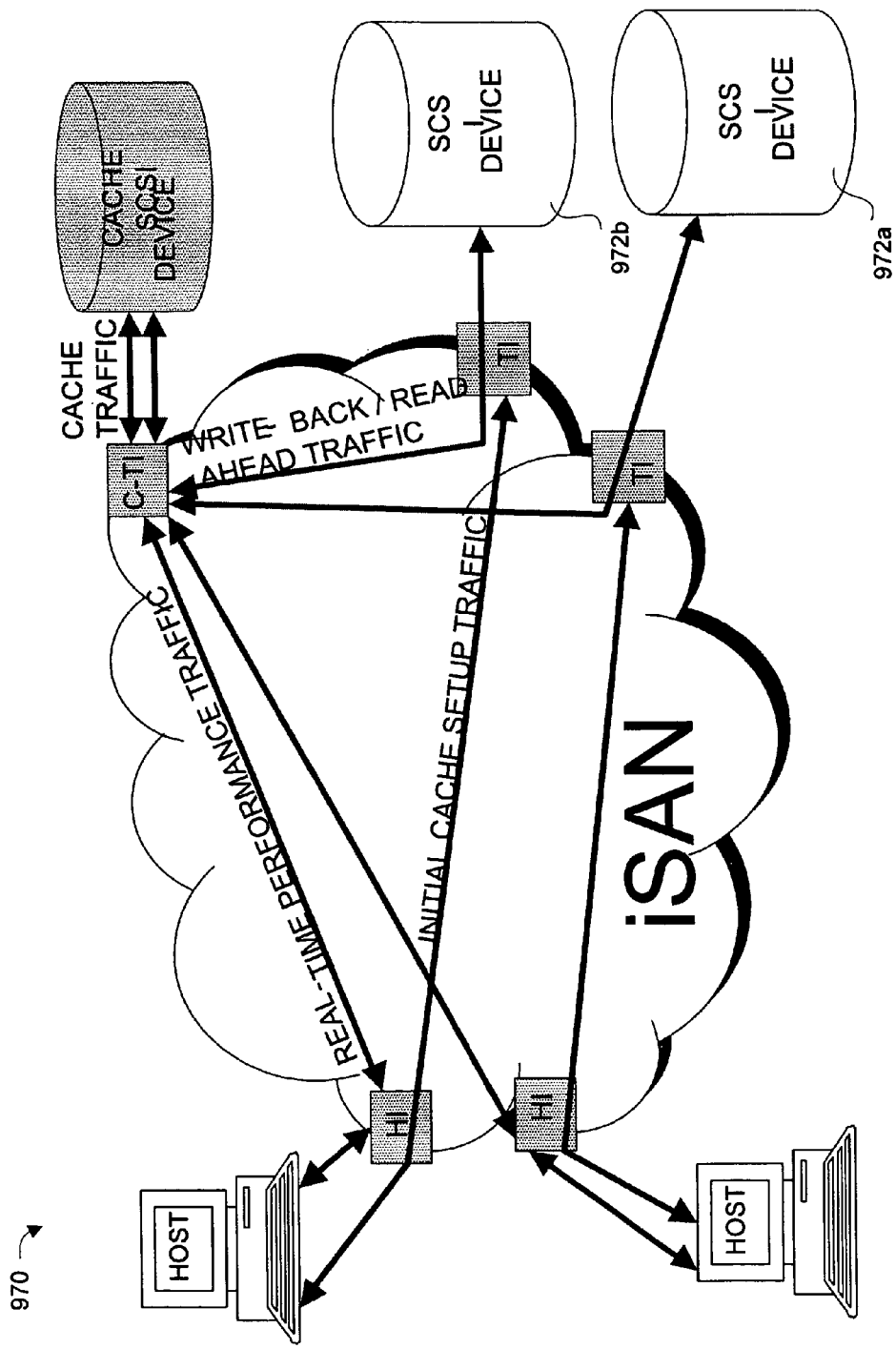
FIG. 9F is a diagrammatic representation of a many-to-many host and target arrangement in accordance with a second example.

FIG. 9F is a diagrammatic representation of a many-to-many host and target arrangement in accordance with a second example. This configuration is similar to the arrangement of FIG. 9E, except that the two different TI ports are accessing two different SCSI storage devices 972a and 972b.

Figure 9G:
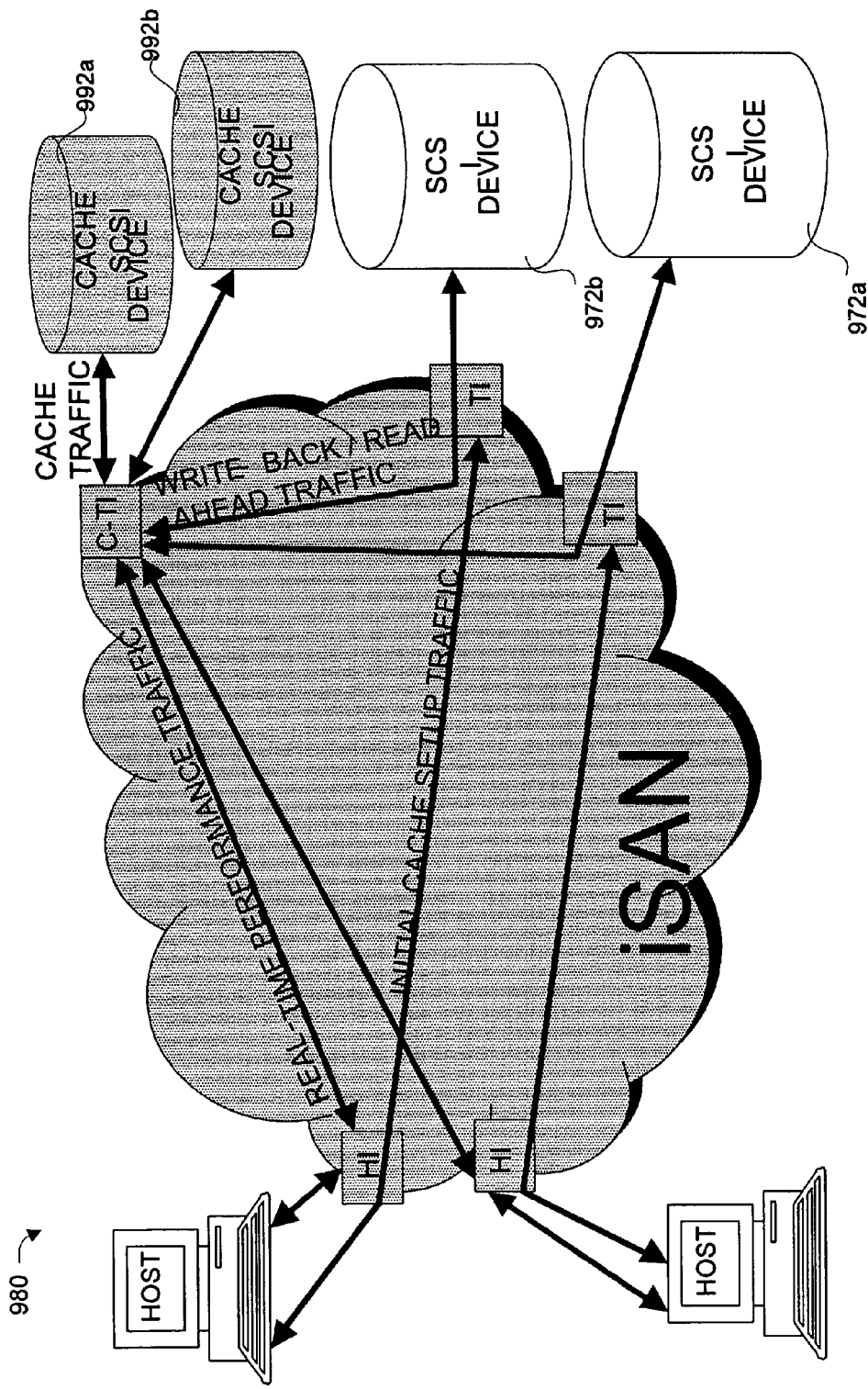
FIG. 9G is a diagrammatic representation of a many-to-many host and target arrangement in accordance with a third example.

FIG. 9G is a diagrammatic representation of a many-to-many host and target arrangement in accordance with a third example. This configuration is similar to the example of FIG. 9F, except that two different cache devices 992a and 992b are used to cache traffic for memory portions from one or both of two different SCSI devices 972. For example, traffic from one or more memory portions of storage device 972a may be cached in cache device 992a, while traffic from one or more memory portions of storage device 972b are cached in cache device 992b. Alternatively, cache device 992a may be used for traffic corresponding to memory portions of both storage devices 972a and 972b, while cache device 992b is used for traffic corresponding to different memory portions of both storage devices 972a and 972b. In sum, data transfer traffic associated with any number of storage devices may be cached and apportioned in any suitable number of cache devices.

In this switch-assisted embodiment, one or more network devices (e.g., switches) may be configured to provide a cache engine for performing the above cache management operations. That is, the processing (cache engine) is separated from the resources (cache memory devices). The cache devices need only include memory and do not need to include any processing capabilities. Accordingly, any type of cache device may utilized and easily replaced and scaled to a different cache device. The cache engine of one or more network devices or switches are configured to provide particular caching arrangements as described above. Caching may be dynamically provided as needed by users, while being nonintrusive as possible to the other traffic of the SAN.

Figure 10:
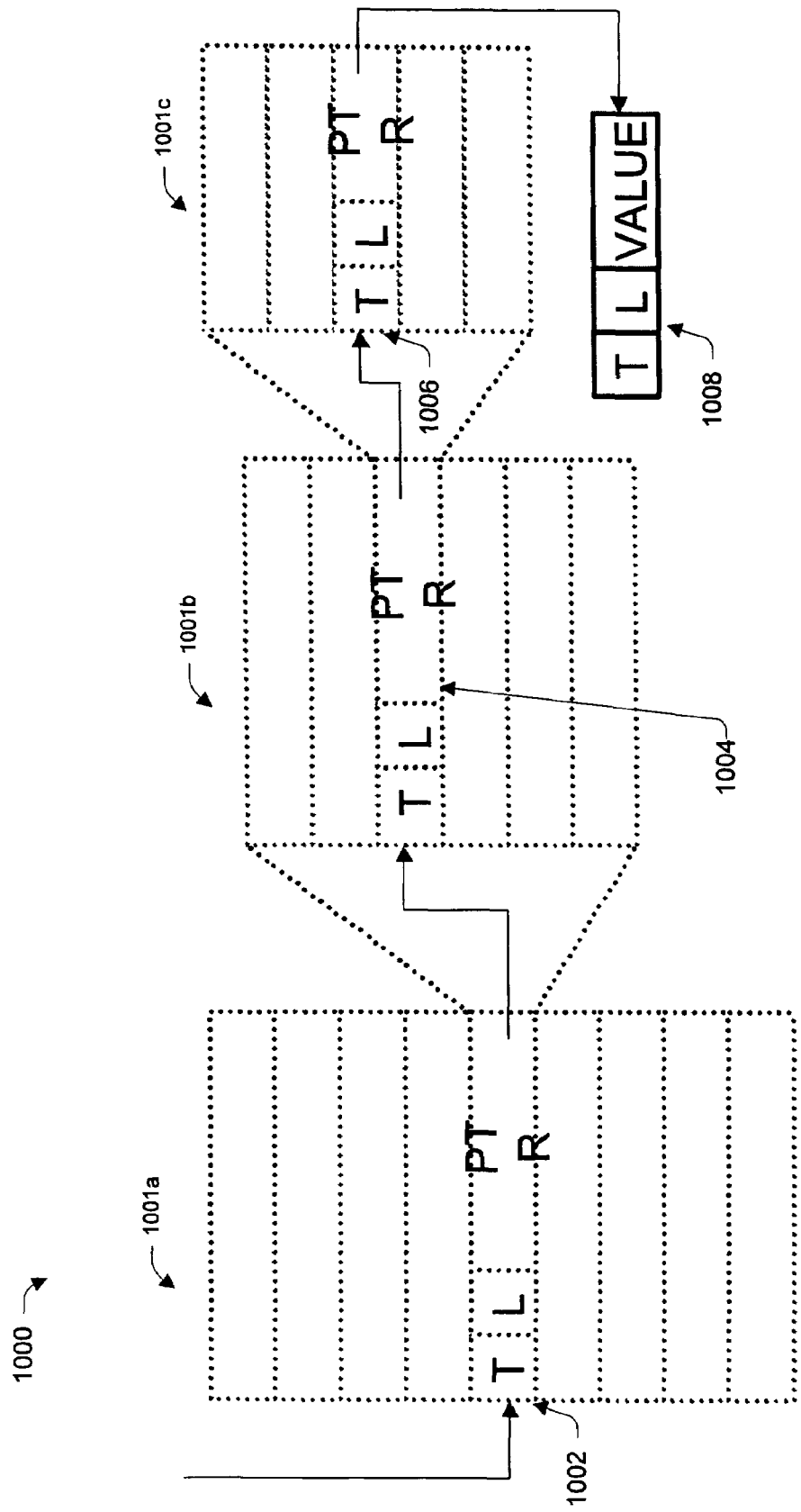
FIG. 10 illustrates a sample cache database in accordance with one implementation of the present invention.

FIG. 10 illustrates a sample cache database 1000 in accordance with one implementation of the present invention. Such a cache database may be utilized by the cache engine to cache data in one or more cache devices. A cache engine database includes one or more index tables, such as tables 1001a~b. Each table includes a plurality of records, such as record 1002 of table 1001a, record 1004 of table 1001b and record 1001c of table 1001c.

Each entry includes a type field T that specifies whether the record is a PTR type or a VALUE type record, a length field L, and a PTR or VALUE field. For a PTR type record, the L field specifies the amount of shift bits to the right (e.g., divide operation) in order to get to the next level data structure or table. For a VALUE type record, the L field specifies the length of the VALUE field. The PTR field specifies the base pointer to the next level index table, and the VALUE field specifies information about the Cache SCSI-Target/LUN from where IO data can be retrieved or into where IO data may be flushed.

The caching Engine database facilitate fast lookups in order to map a given host IO to an applicable Cache SCSI-Target IO. In one implementation, the logical block address (LBA) in a given host IO is shifted to the right by a preconfigured amount to align to say, a GB boundary. The resulting index is used to perform lookup on the index table 1001a. If a match results in a PTR type record, e.g., record 1002, then a second lookup is performed using the current index, shift amount L and PTR field, for example, to obtain record 1004. This operation repeats until a VALUE type record is found, e.g., record 1008 (obtained through intermediary PTR record 1006).

The VALUE field in the VALUE type record provides information as to which Cache SCSI-Target/LUN needs to be accessed and in which LBA range so that the host IO can be mapped. IO data is fetched from the Cache-SCSI-Target/LUN in the case of a host READ IO, whereas IO data is flushed into the Cache-SCSI-Target/LUN in the case of host WRITE IO. If a lookup results in a NULL record, then it indicates that the IO data for the applicable host IO is not present in the cache. In this case, if the Caching Engine decides to enable caching for concerned host IO, then the applicable one or more records are created in the Index table(s).

Figure 11:
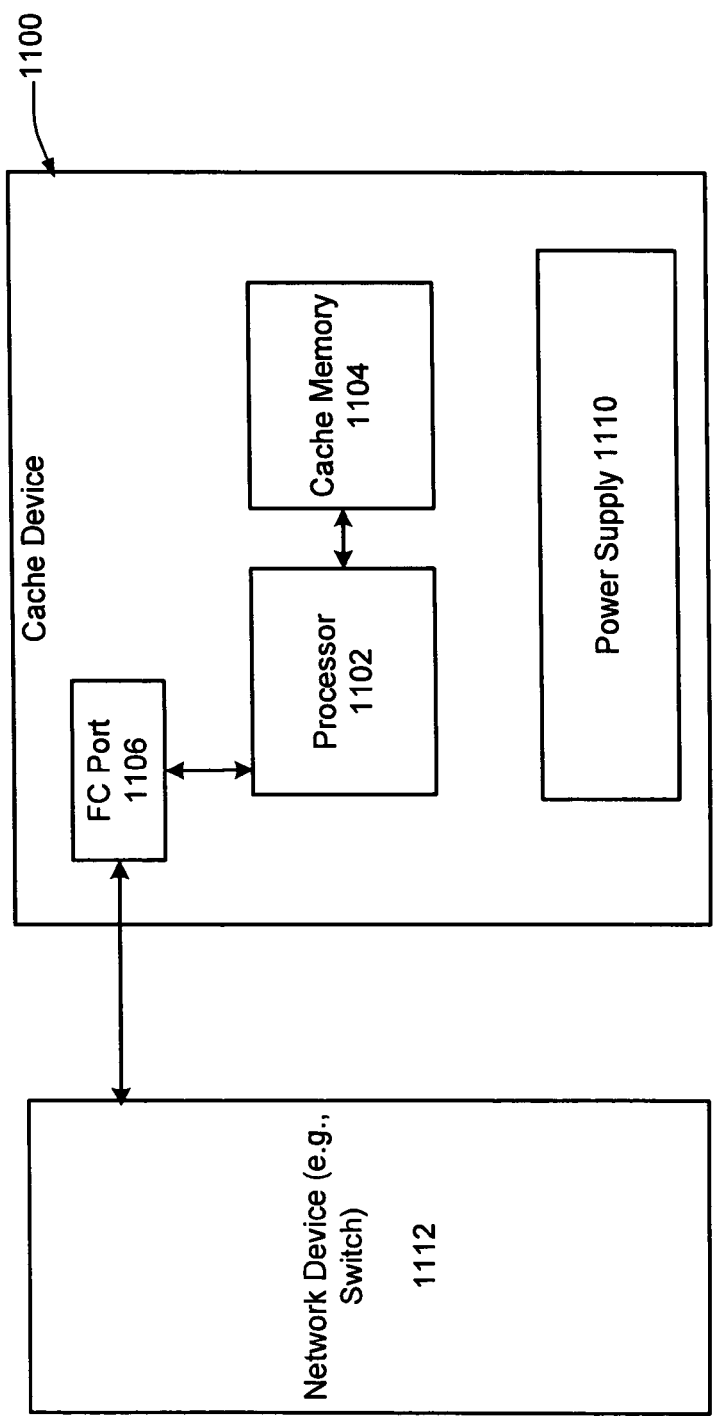
FIG. 11 is a diagrammatic representation of a cache device that can be used to implement caching techniques in accordance with one embodiment of the present invention.

FIG. 11 is a diagrammatic representation of a cache device 1100 that can be used to implement caching techniques in accordance with one embodiment of the present invention. Although one particular configuration will be described, it should be noted that a wide variety of cache device configurations are available. As shown, the cache device 1100 includes a processor 1102 and cache memory 1104 which are coupled with each other. The cache memory may include any suitable type and number of non-volatile memory devices, such as RAM.

When acting under the control of appropriate software or firmware, the processor 1102 is responsible for such cache tasks as memory mapping computations and cache data transfer management. It may also be responsible for requesting to handle data transfer traffic associated with one or more storage devices, handling data transfer traffic redirected to itself, etc. Processor 1102 may accomplish all these functions under the control of software including an operating system and any appropriate applications software. These tasks may be accomplished by one or more processors, such as a processor from the Motorola family of microprocessors or the MIPS family of microprocessors. In an alternative embodiment, processor 1102 is specially designed hardware for controlling the operations of cache device 1100. In a specific embodiment, a memory (such as non-volatile RAM and/or ROM) also forms part of processor 1102. However, there are many different ways in which memory could be coupled to the system. Memory may be used for a variety of purposes such as, for example, storing programming instructions, etc.

Because such information and program instructions may be employed to implement the systems/methods described herein, the present invention relates to machine readable media that include program instructions, state information, etc. for performing various operations described herein.

Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Figure 12:
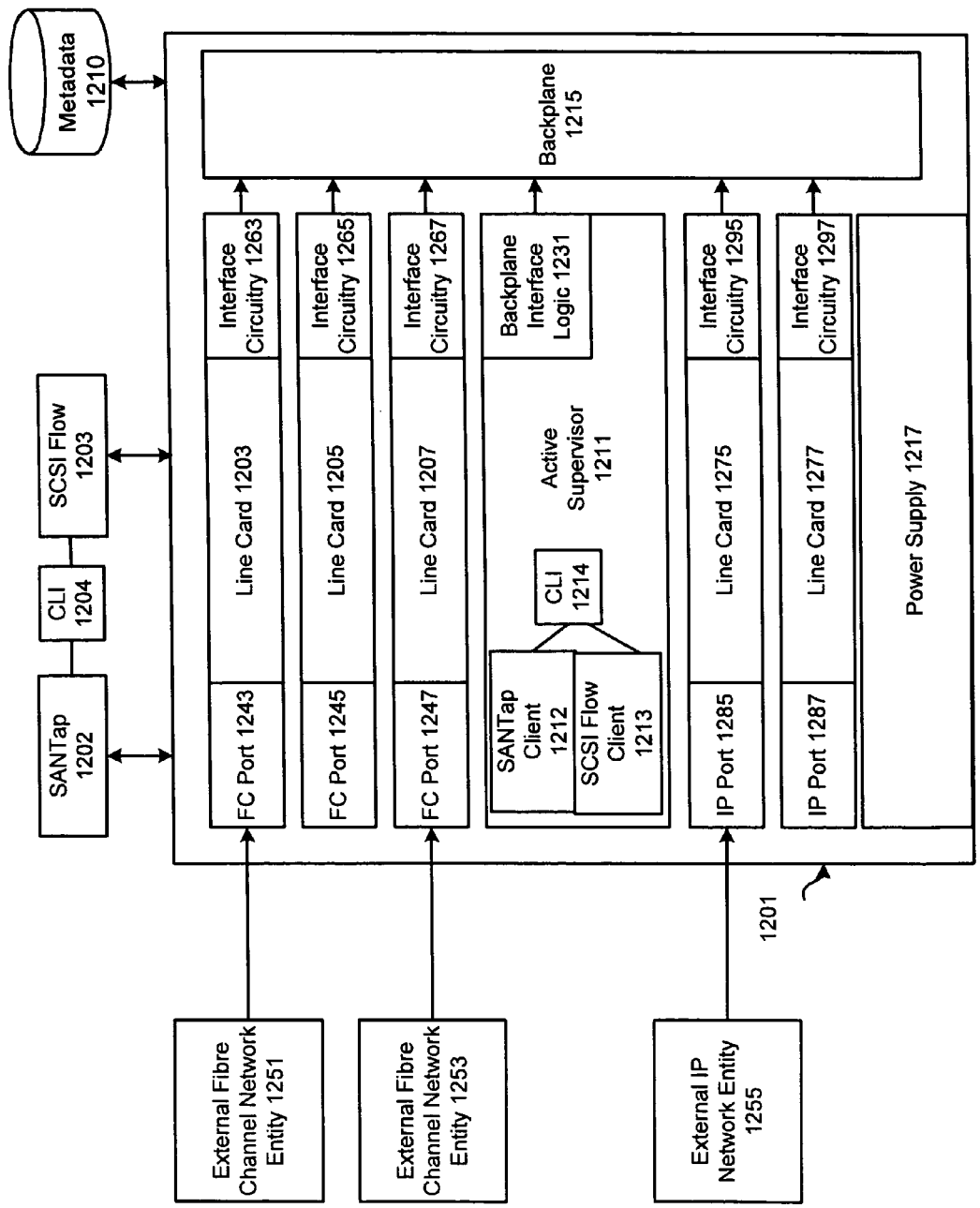
FIG. 12 is a diagrammatic representation of one example of a fibre channel switch that can be used to implement techniques of the present invention.

The cache device 1100 may also include a power supply 1110, such as an emergency battery, and an (FC) Port 1106 for communicating with a network device such a SAN switch 1112 and its SANTap and/or SCSI Flow clients. In a switch assisted caching embodiment, the processor 1102 may be omitted. FIG. 12 is a diagrammatic representation of one example of a fibre channel switch 1201 that can be used to implement techniques of the present invention. Although one particular configuration will be described, it should be noted that a wide variety of switch and router configurations are available. The switch 1201 may include, for example, at least one interface for communicating with one or more SANTap Client(s) 1202 and/or SCSI Flow Client(s) 1203. In at least one implementation, SANTap Client 1202 and SCSI Flow Client 1203 may reside external to the switch 1201, and may also be accessed via a command line interface (CLI) 1204. The switch 1201 may include at least one interface for accessing external metadata information 1210.

The switch 1201 may include one or more supervisors 1211 and power supply 1217. According to various embodiments, the supervisor 1211 has its own processor, memory, and/or storage resources. Additionally, the supervisor 1211 may also include one or more SANTap clients (e.g., SANTap client 1212) and SCSI Flow clients (e.g., SCSI Flow client 1212), which may be adapted, for example, for facilitating redirection or cache services. The supervisor's SANTap and SCSI Flow clients may also each be accessed via a command line interface (CLI), e.g., 1214.

Line cards 1203, 1205, and 1207 can communicate with an active supervisor 1211 through interface circuitry 1263, 1265, and 1267 and the backplane 1215. According to various embodiments, each line card includes a plurality of ports that can act as either input ports or output ports for communication with external fibre channel network entities 1251 and 1253. An example of at least a portion of a line card is illustrated in FIG. 13 of the drawings.

The backplane 1215 can provide a communications channel for all traffic between line cards and supervisors. Individual line cards 1203 and 1207 can also be coupled to external fibre channel network entities 1251 and 1253 through fibre channel (FC) ports 1243 and 1247.

External fibre channel network entities 1251 and 1253 can be nodes such as other fibre channel switches, disks, RAIDS, tape libraries, or servers. The fibre channel switch can also include line cards 1275 and 1277 with IP ports 1285 and 1287. In one example, IP port 1285 is coupled to an external IP network entity 1255. The line cards 1275 and 1277 also have interfaces 1295 and 1297 to the backplane 1215.

It should be noted that the switch can support any number of line cards and supervisors. In the embodiment shown, only a single supervisor is connected to the backplane 1215 and the single supervisor communicates with many different line cards. The active supervisor 1211 may be configured or designed to run a plurality of applications such as routing, domain manager, system manager, port manager, FLOGI server, utility applications, etc. The supervisor may include one or more processors coupled to interfaces for communicating with other entities.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

FIG. 13 is a block diagram illustrating a portion of an exemplary switch or intelligent line card in which various embodiments of the present invention may be implemented. According to a specific embodiment, switch portion 1380 of FIG. 13 may be implemented as one of a plurality of line cards residing in a fibre channel switch such as that illustrated in FIG. 12, for example. In at least one implementation, switch portion 1380 may include a plurality of different components such as, for example, at least one external interface 1381, at least one data path processor (DPP) 1390, at least one control path processor (CPP) 1392, at least one internal interface 1383, etc.

As shown in the example of FIG. 13 the external interface of 1381 may include a plurality of ports 1382 configured or designed to communicate with external devices such as, for example, host devices, storage devices, etc. One or more groups of ports may be managed by a respective data path processor (DPP) unit. According to a specific implementation the data path processor may be configured or designed as a general-purpose microprocessor used to terminate the SCSI protocol and to emulate N_Port/NL_Port functionality. It may also be configured to implement RAID functions for the intelligent port(s) such as, for example, striping and mirroring. In one embodiment, the DPP may be configured or designed to perform volume configuration lookup, virtual to physical translation on the volume address space, exchange state maintenance, scheduling of frame transmission, and/or other functions. In at least some embodiments, the ports 1382 may be referred to as "intelligent" ports or "iPorts" because of the "intelligent" functionality provided by the managing DPPs. Additionally, in at least some embodiments, the term iPort and DPP may be used interchangeably when referring to such "intelligent" functionality. In a specific embodiment of the invention, the virtualization logic may be separately implemented at individual ports of a given switch. This allows the virtualization processing capacity to be closely matched with the exact needs of the switch (and the virtual enclosure) on a per port basis. For example, if a request is received at a given port for accessing a virtual LUN address location in the virtual volume, the DPP may be configured or designed to perform the necessary mapping calculations in order to determine the physical disk location corresponding to the virtual LUN address.

As illustrated in FIG. 13, switch portion 1380 may also include a control path processor (CPP) 1392 configured or designed to perform control path processing for storage virtualization. In at least one implementation, functions performed by the control path processor may include, for example, calculating or generating virtual-to-physical (V2P) mappings, processing of port login and process login for volumes; communicating with name server(s); etc.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A method of facilitating caching in a storage area network (SAN), the method comprising:
    identifying a first memory portion of a first storage device for caching in a first cache module; and
    in response to data transfer traffic being sent to the first memory portion of the first storage device, causing data that resides at the first memory portion of the first storage device to be cached at the first cache module or another cache module associated with the first cache module, wherein the caching is at least initiated by one or more network device(s) of the SAN.

2. A method as recited in claim 1, wherein the caching is at least initiated by a switch.

3. A method as recited in claim 1, wherein the initiation of the caching is accomplished by one or more network devices in the SAN redirecting data transfer traffic being sent to the first memory portion of the first storage device to the first cache module.

4. A method as recited in claim 3, wherein the redirection is accomplished by a SANTap service provided by the one or more network device(s).

5. A method as recited in claim 1, wherein the initiation of the caching is accomplished by setting up caching using a SCSI (Small Computer System Interface) Flow service provided by the one or more network device(s).

6. A method as recited in claim 4, wherein the first cache module performs the identification operation by communication with the SANTap service to thereby cause the redirection.

7. A method as recited in claim 6, further comprising:
    receiving the redirected traffic at the first cache module; and
    if the redirected traffic is a READ request, sending READ data from the first cache module to the requestor who sent the READ request whereby the READ data is retrieved from a second cache module if a borrowed memory portion corresponding to the first memory portion is borrowed from the second cache module and the READ data is retrieved from the first storage device if the first or second cache module do not have the READ data.

8. A method as recited in claim 6, further comprising:
    receiving the redirected traffic at the first cache module;
    if the redirected traffic is a WRITE request and memory usage of the first cache module is not above a predetermined level, writing WRITE data associated with the WRITE request in a memory portion of the first cache module; and
    if the redirected traffic is a WRITE request and memory usage of the first cache module is above a predetermined level, writing WRITE data associated with the WRITE request in a borrowed memory portion of a second cache module.

9. A method as recited in claim 8, further comprising the first cache module querying one or more importing cache module(s) to reclaim one or more donated memory portions of the first cache module if memory usage of the first cache module is above a predetermined level.

10. A method as recited in claim 8, further comprising if the memory usage falls below the predetermined level, the first cache module releasing the borrowed memory portion from the second cache module.

11. A method as recited in claim 1, further comprising:
    the first cache module sending a HELLO message to one or more other cache module(s) specifying that it is active and listing one or more of the first cache module's memory portions that are used for caching traffic for one or more memory portions of one or more storage device(s); and
    when the first cache module fails to receiving a HELLO message from a one of the other cache module(s), taking over one or more of the memory portions of the failed cache module.

12. A method as recited in claim 5, wherein the initiating caching is accomplished at the one or more network devices by:
    (a) providing a port coupled to the first cache module and having an Exact Match ITL for receiving traffic that is sent from a host to the identified first memory portion; and
    (b) creating at a port coupled to the identified host and having an Exact Match ITL for trapping traffic that is sent from a host to the identified first memory portion and then redirecting such trapped traffic to the port of the first cache module.

13. A method as recited in claim 12, further comprising sending, from the one or more network devices, a BUSY status to the host when the host initially sends a READ or a WRITE request to the identified first memory portion and wherein operations (a) and (b) are performed after the BUSY status is sent.

14. A method as recited in claim 12, further comprising sending, from the one or more network devices, the traffic also to first storage device when it is a WRITE request.

15. A method as recited in claim 14, further comprising retrieving READ data from the first storage device when the redirected traffic is a READ request and the first cache module does not have the requested READ data, wherein the retrieving is performed by the one or more network devices.

16. A method as recited in claim 1, further comprising:
    identifying a second memory portion for caching in the first cache module; and
    causing data traffic sent to the second memory portion to be cached in the first cache module, wherein the caching is caused by one or more network devices of the SAN.

17. A method as recited in claim 5, wherein one or more network devices in the SAN include a cache engine for analyzing the traffic to the first memory portion, determining whether there is a cache miss, writing data into or serving data from the first cache module for the first memory portion, and handling a cache miss if it occurs.

18. An apparatus for facilitating caching in a storage area network (SAN), comprising:
    one or more processors;
    one or more memory, wherein at least one of the processors and memory are adapted for:
    identifying a first memory portion of a first storage device for caching in a first cache module; and
    in response to data transfer traffic being sent to the first memory portion of the first storage device, causing data that resides at the first memory portion of the first storage device to be cached at the first cache module or another cache module associated with the first cache module, wherein the caching is at least initiated by one or more network device(s) of the SAN.

19. An apparatus as recited in claim 18, wherein the caching is at least initiated by a switch.

20. An apparatus as recited in claim 18, wherein the initiation of the caching is accomplished by one or more network devices in the SAN redirecting data transfer traffic being sent to the first memory portion of the first storage device to the first cache module.

21. An apparatus as recited in claim 18, wherein the redirection is accomplished by a SANTap service provided by the one or more network device(s).

22. An apparatus as recited in claim 20, wherein the initiation of the caching is accomplished by setting up caching using a SCSI (Small Computer System Interface) Flow service provided by the one or more network device(s).

23. An apparatus as recited in claim 21, wherein the first cache module performs the identification operation by communication with the SANTap service to thereby cause the redirection.

24. An apparatus as recited in claim 23, wherein at least one of the processors and memory are further adapted for:
receiving the redirected traffic at the first cache module; and
if the redirected traffic is a READ request, sending READ data from the first cache module to the requestor who sent the READ request whereby the READ data is retrieved from a second cache module if a borrowed memory portion corresponding to the first memory portion is borrowed from the second cache module and the READ data is retrieved from the first storage device if the first or second cache module do not have the READ data.

25. An apparatus as recited in claim 23, wherein at least one of the processors and memory are further adapted for:
receiving the redirected traffic at the first cache module;
if the redirected traffic is a WRITE request and memory usage of the first cache module is not above a predetermined level, writing WRITE data associated with the WRITE request in a memory portion of the first cache module; and
if the redirected traffic is a WRITE request and memory usage of the first cache module is above a predetermined level, writing WRITE data associated with the WRITE request in a borrowed memory portion of a second cache module.

26. An apparatus as recited in claim 25, wherein at least one of the processors and memory are further adapted for the first cache module querying one or more importing cache module(s) to reclaim one or more donated memory portions of the first cache module if memory usage of the first cache module is above a predetermined level.

27. An apparatus as recited in claim 25, wherein at least one of the processors and memory are further adapted for if the memory usage falls below the predetermined level, the first cache module releasing the borrowed memory portion from the second cache module.

28. An apparatus as recited in claim 18, wherein at least one of the processors and memory are further adapted for:
the first cache module sending a HELLO message to one or more other cache module(s) specifying that it is active and listing one or more of the first cache module's memory portions that are used for caching traffic for one or more memory portions of one or more storage device(s); and
when the first cache module fails to receiving a HELLO message from a one of the other cache module(s), taking over one or more of the memory portions of the failed cache module.

29. An apparatus as recited in claim 22, wherein the initiating caching is accomplished by:
(a) providing a port coupled to the first cache module and having an Exact Match ITL for receiving redirected traffic that is sent from the identified host to the identified first memory portion; and
(b) creating at a port coupled to the identified host and having an Exact Match ITL for trapping traffic that is sent from the identified host to the identified first memory portion and then redirecting such trapped traffic to the port of the first cache module.

30. An apparatus as recited in claim 29, wherein at least one of the processors and memory are further adapted for sending a BUSY status to the identified host when the host initially sends a READ or a WRITE request to the identified first memory portion and wherein operations (a) and (b) are performed after the BUSY status is sent.

31. An apparatus as recited in claim 29, wherein at least one of the processors and memory are further adapted for sending, from the one or more network devices, the traffic also to first storage device when it is a WRITE request.

32. An apparatus as recited in claim 31, wherein at least one of the processors and memory are further adapted for comprising retrieving READ data from the first storage device when the redirected traffic is a READ request and the first cache module does not have the requested READ data, wherein the retrieving is performed by the one or more network devices.

33. An apparatus for facilitating caching in a storage area network (SAN), comprising:
means for identifying a first memory portion of a first storage device for caching in a first cache module; and
means for in response to data transfer traffic being sent to the first memory portion of the first storage device, causing data that resides at the first memory portion of the first storage device to be cached at the first cache module or another cache module associated with the first cache module, wherein the caching is at least initiated by one or more network device(s) of the SAN.

34. A system for facilitating caching in a storage area network (SAN), comprising:
a host for accessing a storage device;
a storage device for storing data; and
one or more cache modules for caching data in the SAN;
the system operable for:
identifying a first memory portion of a first storage device for caching in a first cache module; and
in response to data transfer traffic being sent to the first memory portion of the first storage device, causing data that resides at the first memory portion of the first storage device to be cached at the first cache module or another cache module associated with the first cache module, wherein the caching is at least initiated by one or more network device(s) of the SAN.

* * * * *